(12) United States Patent
Brezina et al.

(10) Patent No.: US 11,811,714 B2
(45) Date of Patent: Nov. 7, 2023

(54) APPLICATION PROGRAMMING INTERFACES FOR COMMUNICATION SYSTEMS

(71) Applicant: VERIZON MEDIA INC., New York, NY (US)

(72) Inventors: Matthew Brezina, San Francisco, CA (US); Adam Smith, San Francisco, CA (US); Gregory Duffy, San Francisco, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 122 days.

(21) Appl. No.: 16/108,208

(22) Filed: Aug. 22, 2018

(65) Prior Publication Data

US 2018/0359325 A1 Dec. 13, 2018

Related U.S. Application Data

(63) Continuation of application No. 12/180,471, filed on Jul. 25, 2008, now Pat. No. 10,069,924.

(Continued)

(51) Int. Cl.
*G06F 3/048* (2013.01)
*H04L 51/216* (2022.01)
(Continued)

(52) U.S. Cl.
CPC .......... *H04L 51/216* (2022.05); *G06F 3/0481* (2013.01); *G06F 3/0482* (2013.01); *G06F 3/0484* (2013.01); *G06F 3/04842* (2013.01); *G06F 16/248* (2019.01); *G06F 16/24575* (2019.01); *G06F 16/38* (2019.01); *G06F 16/9577* (2019.01); *G06F 40/14* (2020.01); *H04L 51/046* (2013.01); *H04L 51/42* (2022.05); *H04L 51/56* (2022.05); *H04L 67/306* (2013.01); *H04L 67/535* (2022.05); *H04M 15/00* (2013.01); *H04M 15/43* (2013.01); *H04M 15/44* (2013.01); *H04M 15/58* (2013.01);
(Continued)

(58) Field of Classification Search
CPC ......... G06F 3/0481–0489; G06F 16/38; G06F 16/248; G06F 3/0482; G06F 3/0484; G06F 3/048; G06F 16/9535; G06F 16/24578; G06F 16/9024; G06F 3/04842; H04L 51/22; H04L 51/16; H04L 51/36; H04L 67/306; H04L 51/08; H04L 51/32; H04L 63/102; H04M 15/58; H04M 2215/0188; H04M 15/745; G06Q 50/01; G06Q 30/0269; G06Q 30/0256
See application file for complete search history.

(56) References Cited

U.S. PATENT DOCUMENTS 5,579,472 A * 11/1996 Keyworth, II ....... G06Q 10/107
715/751
5,903,634 A * 5/1999 Wakabayashi ...... H04M 1/2746
379/127.01

(Continued)

*Primary Examiner* — Steven B Theriault

(57) ABSTRACT

Among other disclosures, a method may include receiving a trigger identifying a person associated with a communication, the communication being transmitted by a communication application. The method may include retrieving information relating to the person. The method may include providing the information to an interface associated with the communication application.

20 Claims, 6 Drawing Sheets

Related U.S. Application Data

(60) Provisional application No. 60/951,880, filed on Jul. 25, 2007.

(51) Int. Cl.

| | | |
|---|---|---|
| *G06F 3/0484* | (2022.01) | |
| *G06F 3/0481* | (2022.01) | |
| *G06F 16/38* | (2019.01) | |
| *G06F 16/248* | (2019.01) | |
| *G06F 16/957* | (2019.01) | |
| *G06F 16/2457* | (2019.01) | |
| *H04M 15/00* | (2006.01) | |
| *H04L 67/306* | (2022.01) | |
| *G06F 40/14* | (2020.01) | |
| *H04L 51/42* | (2022.01) | |
| *H04L 51/56* | (2022.01) | |
| *H04L 67/50* | (2022.01) | |
| *H04W 24/08* | (2009.01) | |
| *G06F 3/04842* | (2022.01) | |
| *H04L 51/046* | (2022.01) | |
| *G06F 3/0482* | (2013.01) | |
| *H04L 51/08* | (2022.01) | |

(52) U.S. Cl.
CPC ......... *H04M 15/745* (2013.01); *H04W 24/08* (2013.01); *G06F 3/048* (2013.01); *H04L 51/08* (2013.01); *H04M 2215/0104* (2013.01); *H04M 2215/0108* (2013.01); *H04M 2215/0188* (2013.01)

(56) References Cited

U.S. PATENT DOCUMENTS

| | | | | |
|---|---|---|---|---|
| 6,202,058 | B1* | 3/2001 | Rose | G06F 16/335 |
| | | | | 706/45 |
| 6,351,764 | B1* | 2/2002 | Voticky | G06Q 10/107 |
| | | | | 709/206 |
| 6,487,584 | B1* | 11/2002 | Bunney | H04L 67/14 |
| | | | | 709/206 |
| 6,772,188 | B1* | 8/2004 | Cloutier | H04L 29/06 |
| | | | | 709/204 |
| 6,832,245 | B1* | 12/2004 | Isaacs | G06F 16/24578 |
| | | | | 709/206 |
| 7,035,925 | B1* | 4/2006 | Nareddy | H04L 67/22 |
| | | | | 709/224 |
| 7,072,942 | B1* | 7/2006 | Maller | H04L 51/12 |
| | | | | 709/206 |
| 7,139,800 | B2* | 11/2006 | Bellotti | G06Q 10/107 |
| | | | | 709/206 |
| 7,167,910 | B2* | 1/2007 | Farnham | G06F 3/0481 |
| | | | | 709/206 |
| 7,194,516 | B2* | 3/2007 | Giacobbe | G06Q 10/107 |
| | | | | 709/206 |
| 7,418,663 | B2 | 8/2008 | Pettinati et al. | |
| 7,454,470 | B1* | 11/2008 | Isaacs | G06F 16/24578 |
| | | | | 709/206 |
| 7,454,716 | B2* | 11/2008 | Venolia | G06Q 10/107 |
| | | | | 715/853 |
| 7,590,696 | B1* | 9/2009 | Odell | G06Q 10/107 |
| | | | | 709/206 |
| 7,673,327 | B1* | 3/2010 | Polis | G06F 21/6236 |
| | | | | 726/5 |
| 7,739,259 | B2* | 6/2010 | Hartwell | G06F 16/332 |
| | | | | 707/706 |
| 7,818,396 | B2 | 10/2010 | Dolin et al. | |
| 7,921,063 | B1* | 4/2011 | Quinlan | G06N 7/005 |
| | | | | 706/12 |
| 7,974,849 | B1* | 7/2011 | Begole | G06Q 10/0631 |
| | | | | 705/1.1 |
| 7,984,484 | B1* | 7/2011 | Rakowski | H04L 51/00 |
| | | | | 726/3 |
| 7,991,764 | B2* | 8/2011 | Rathod | G06Q 20/322 |
| | | | | 707/713 |
| 8,019,051 | B1* | 9/2011 | Childs | H04M 1/7255 |
| | | | | 379/67.1 |
| 8,073,928 | B2 | 12/2011 | Dolin et al. | |
| 8,200,808 | B2* | 6/2012 | Ishida | H04L 67/22 |
| | | | | 709/224 |
| 8,255,811 | B2* | 8/2012 | Lynn | H04M 1/72547 |
| | | | | 715/753 |
| 8,392,836 | B1* | 3/2013 | Bau | G06F 16/9558 |
| | | | | 715/752 |
| 8,413,059 | B2* | 4/2013 | Lee | G06Q 10/107 |
| | | | | 715/752 |
| 8,577,967 | B1* | 11/2013 | Chavez | H04L 51/22 |
| | | | | 709/206 |
| 8,751,582 | B1* | 6/2014 | Behforooz | H04L 51/043 |
| | | | | 709/206 |
| 9,020,938 | B2* | 4/2015 | Cort | G06F 3/048 |
| | | | | 707/732 |
| 9,225,537 | B1* | 12/2015 | Hendricks | H04L 12/1813 |
| 9,408,077 | B1* | 8/2016 | David | H04W 4/14 |
| 9,454,735 | B2* | 9/2016 | Banga | H04L 51/224 |
| 2001/0044829 | A1* | 11/2001 | Lundberg | G06Q 10/107 |
| | | | | 709/206 |
| 2002/0024536 | A1 | 2/2002 | Kahan et al. | |
| 2002/0073233 | A1* | 6/2002 | Gross | H04L 61/30 |
| | | | | 709/206 |
| 2002/0080413 | A1* | 6/2002 | Sommerer | G06Q 10/107 |
| | | | | 358/402 |
| 2002/0107991 | A1 | 8/2002 | Maguire et al. | |
| 2002/0129011 | A1* | 9/2002 | Julien | G06F 16/951 |
| 2002/0152272 | A1* | 10/2002 | Yairi | H04L 51/48 |
| | | | | 715/752 |
| 2003/0065776 | A1* | 4/2003 | Malik | H04L 61/1576 |
| | | | | 709/225 |
| 2003/0074583 | A1* | 4/2003 | Habegger | H04L 63/205 |
| | | | | 726/4 |
| 2003/0105826 | A1* | 6/2003 | Mayraz | G06F 16/9535 |
| | | | | 709/206 |
| 2003/0167310 | A1* | 9/2003 | Moody | G06Q 10/107 |
| | | | | 709/206 |
| 2003/0167324 | A1* | 9/2003 | Farnham | G06Q 10/10 |
| | | | | 709/224 |
| 2003/0233419 | A1* | 12/2003 | Beringer | G06Q 10/107 |
| | | | | 709/206 |
| 2004/0054646 | A1* | 3/2004 | Daniell | H04L 51/36 |
| 2004/0100497 | A1 | 5/2004 | Quillen et al. | |
| 2004/0128356 | A1 | 7/2004 | Bernstein et al. | |
| 2004/0153512 | A1* | 8/2004 | Friend | G06Q 10/10 |
| | | | | 709/206 |
| 2004/0158609 | A1* | 8/2004 | Daniell | H04L 51/04 |
| | | | | 709/206 |
| 2005/0004989 | A1* | 1/2005 | Satterfield | G06Q 10/107 |
| | | | | 709/206 |
| 2005/0015432 | A1* | 1/2005 | Cohen | H04L 12/66 |
| | | | | 709/201 |
| 2005/0015451 | A1* | 1/2005 | Sheldon | H04L 51/212 |
| | | | | 709/206 |
| 2005/0044152 | A1* | 2/2005 | Hardy | H04L 29/12103 |
| | | | | 709/206 |
| 2005/0055639 | A1 | 3/2005 | Fogg | |
| 2005/0080867 | A1* | 4/2005 | Malik | H04L 51/04 |
| | | | | 709/207 |
| 2005/0091272 | A1 | 4/2005 | Smith et al. | |
| 2005/0091314 | A1* | 4/2005 | Blagsvedt | G06Q 10/10 |
| | | | | 709/204 |
| 2005/0091320 | A1* | 4/2005 | Kirsch | H04L 51/12 |
| | | | | 709/206 |
| 2005/0102257 | A1 | 5/2005 | Onyon | G06F 16/27 |
| 2005/0114781 | A1* | 5/2005 | Brownholtz | G06F 3/0482 |
| | | | | 715/733 |
| 2005/0159970 | A1* | 7/2005 | Buyukkokten | G06Q 30/02 |
| | | | | 705/319 |
| 2005/0160167 | A1* | 7/2005 | Cheng | H04L 51/24 |
| | | | | 709/224 |
| 2005/0164704 | A1 | 7/2005 | Winsor | |

(56) References Cited

U.S. PATENT DOCUMENTS

| | | |
|---|---|---|
| 2005/0171799 A1 | 8/2005 | Hull et al. |
| 2005/0174975 A1* | 8/2005 | Mgrdechian ....... G06Q 30/0269 370/338 |
| 2005/0182745 A1* | 8/2005 | Dhillon ................ G06Q 10/10 |
| 2005/0198171 A1* | 9/2005 | Landsman ........... G06Q 10/107 709/206 |
| 2005/0198299 A1* | 9/2005 | Beck ..................... H04L 67/00 709/226 |
| 2005/0203929 A1* | 9/2005 | Hazarika ................ G06Q 10/00 |
| 2005/0204007 A1* | 9/2005 | McGregor ........... G06Q 10/107 709/206 |
| 2005/0210107 A1* | 9/2005 | Mora ..................... H04L 51/28 709/206 |
| 2005/0216300 A1 | 9/2005 | Appelman et al. |
| 2005/0289470 A1* | 12/2005 | Pabla ..................... G06F 21/41 715/751 |
| 2006/0004914 A1* | 1/2006 | Kelly ..................... G06Q 30/00 709/219 |
| 2006/0010217 A1* | 1/2006 | Sood ..................... H04L 51/12 709/206 |
| 2006/0010395 A1* | 1/2006 | Aaltonen .......... H04M 1/72583 715/779 |
| 2006/0013205 A1* | 1/2006 | Daniell .................. H04L 67/14 370/352 |
| 2006/0031366 A1* | 2/2006 | Dolph ................... H04L 51/04 709/207 |
| 2006/0047725 A1* | 3/2006 | Bramson ............... G06F 21/604 |
| 2006/0047805 A1* | 3/2006 | Byrd .................... G06F 11/3495 709/224 |
| 2006/0072723 A1* | 4/2006 | Chung ................... H04L 51/14 379/93.24 |
| 2006/0085419 A1 | 4/2006 | Rosen |
| 2006/0085483 A1* | 4/2006 | Mooney ................ G06F 16/273 |
| 2006/0085752 A1* | 4/2006 | Beadle ................. G06Q 10/107 715/751 |
| 2006/0123347 A1* | 6/2006 | Hewitt ................... G06F 40/166 715/748 |
| 2006/0167991 A1* | 7/2006 | Heikes ................... H04L 51/04 709/204 |
| 2006/0168059 A1* | 7/2006 | Chang ................. G06Q 10/107 709/206 |
| 2006/0173961 A1* | 8/2006 | Turski ................... H04L 51/22 709/206 |
| 2006/0218111 A1* | 9/2006 | Cohen .................. G06Q 10/10 706/45 |
| 2006/0224675 A1 | 10/2006 | Fox et al. |
| 2006/0230117 A1* | 10/2006 | Gross ................... H04L 51/26 709/207 |
| 2006/0235933 A1* | 10/2006 | Baluja ................. G06Q 10/107 709/207 |
| 2006/0242663 A1 | 10/2006 | Gogerty |
| 2006/0282303 A1 | 12/2006 | Hale et al. |
| 2007/0011158 A1* | 1/2007 | Parikh .................... G06Q 10/10 |
| 2007/0032267 A1* | 2/2007 | Haitani ................ H04L 51/066 455/556.2 |
| 2007/0060328 A1 | 3/2007 | Zrike et al. |
| 2007/0061308 A1* | 3/2007 | Hartwell ................ G06F 3/0484 |
| 2007/0067392 A1* | 3/2007 | Torres ................. H04L 51/043 709/206 |
| 2007/0067439 A1* | 3/2007 | Mason ................. H04L 67/306 709/224 |
| 2007/0071187 A1 | 3/2007 | Apreutesei et al. |
| 2007/0094304 A1* | 4/2007 | Horner .................. G06Q 10/10 |
| 2007/0097969 A1* | 5/2007 | Regnier ................ H04L 41/00 370/390 |
| 2007/0112761 A1* | 5/2007 | Xu .................... G06F 16/24578 |
| 2007/0115991 A1 | 5/2007 | Ramani et al. |
| 2007/0135099 A1* | 6/2007 | Taylor ................. G06F 16/958 455/412.1 |
| 2007/0143414 A1 | 6/2007 | Daigle |
| 2007/0162432 A1* | 7/2007 | Armstrong .......... G06Q 10/107 |
| 2007/0174432 A1* | 7/2007 | Rhee ................... H04L 67/22 709/219 |
| 2007/0208802 A1* | 9/2007 | Barman ................. G06Q 10/10 709/203 |
| 2007/0218900 A1 | 9/2007 | Abhyanker |
| 2008/0005247 A9 | 1/2008 | Khoo |
| 2008/0005341 A1* | 1/2008 | Subbian ............... H04L 12/1822 709/229 |
| 2008/0010377 A1* | 1/2008 | Nissenboim .......... H04L 63/20 709/226 |
| 2008/0037721 A1 | 2/2008 | Yao et al. |
| 2008/0051081 A1* | 2/2008 | Nelson ................... H04L 67/22 455/432.3 |
| 2008/0059627 A1* | 3/2008 | Hamalainen .......... H04M 1/663 709/224 |
| 2008/0113674 A1 | 5/2008 | Baig |
| 2008/0119201 A1 | 5/2008 | Kolber et al. |
| 2008/0134035 A1* | 6/2008 | Pennington ............ G06Q 10/10 715/713 |
| 2008/0162649 A1* | 7/2008 | Lee ......................... H04L 51/32 709/206 |
| 2008/0168134 A1* | 7/2008 | Goodman ............. G06F 16/907 709/204 |
| 2008/0172464 A1* | 7/2008 | Thattai ................ G06Q 10/109 709/205 |
| 2008/0220752 A1* | 9/2008 | Forstall ................ G06F 3/0488 455/415 |
| 2008/0222127 A1* | 9/2008 | Bergin ............... G06F 16/9017 |
| 2008/0256107 A1* | 10/2008 | Banga ..................... H04L 51/36 |
| 2008/0270560 A1* | 10/2008 | Tysowski ................ H04L 51/22 709/207 |
| 2008/0270939 A1* | 10/2008 | Mueller ............... G06F 3/04817 715/811 |
| 2008/0294768 A1* | 11/2008 | Sampson ................ H04L 67/22 709/224 |
| 2008/0313603 A1* | 12/2008 | Denkel ............... G06F 11/3664 717/106 |
| 2008/0316925 A1* | 12/2008 | Dolin ..................... G06Q 30/02 370/232 |
| 2008/0319943 A1* | 12/2008 | Fischer ................. G06F 16/248 |
| 2009/0019004 A1* | 1/2009 | Abhyanker ............ G06Q 30/02 |
| 2009/0037350 A1* | 2/2009 | Rudat ................... G06Q 10/107 706/11 |
| 2009/0125518 A1* | 5/2009 | Bailor ................... G06F 40/166 |
| 2009/0138828 A1* | 5/2009 | Schultz ................. G06Q 10/10 715/853 |
| 2009/0150507 A1* | 6/2009 | Davis ..................... H04L 51/14 709/207 |
| 2009/0157717 A1* | 6/2009 | Palahnuk ............... G06Q 30/00 |
| 2009/0177754 A1* | 7/2009 | Brezina ................ G06Q 10/107 709/206 |
| 2009/0228555 A1* | 9/2009 | Joviak ................. G06Q 10/107 709/205 |
| 2009/0327294 A1* | 12/2009 | Bailor ................... G06F 16/176 |
| 2010/0281007 A1* | 11/2010 | Bailor ..................... G06F 16/93 707/704 |
| 2010/0281362 A1* | 11/2010 | Bailor .................. G06F 40/166 715/256 |
| 2012/0017158 A1 | 1/2012 | Maguire et al. |
| 2015/0199651 A1* | 7/2015 | Raman ............... G06Q 10/1095 705/7.19 |

* cited by examiner

APPLICATION PROGRAMMING INTERFACES FOR COMMUNICATION SYSTEMS

PRIORITY APPLICATION

This patent application claims the benefit of and is a continuation of U.S. patent application Ser. No. 12/180,471, filed on Jul. 25, 2008, titled "Application Programming Interfaces for Communication Systems", which claims priority to U.S. Provisional Application No. 60/951,880, filed on Jul. 25, 2007, entitled, "Presentation of Personal and Public Data Queried Through Implicit Actions", which are both incorporated by reference herein in their entirety.

BACKGROUND

Electronic communications between persons for both business and personal use have increased substantially in recent years. In addition to the number of communications increasing, the number of available communication mediums has also increased. In addition to e-mail communications and telephone communications, additional forms of communication have become common in recent years, including instant messaging, social network messaging and commenting, message board posting, text messaging, and Voice Over Internet Protocol communications.

These additional forms of communication have led to individuals exchanging communications with more people than ever before, which leads to an even higher increase in the number of communications sent and received by an individual.

SUMMARY

The present disclosure relates to collecting and presenting historical communication data and personal data.

In a first aspect, a computer implemented method can include receiving a trigger identifying a person associated with a communication, the communication being transmitted by a communication application. The method can further include retrieving information relating to the person. The method can further include providing the information to an interface associated with the communication application.

Aspects of the invention can include none, one or more of the following features. The method can further include generating one or more graphic displays incorporating the provided information. The method can further include incorporating one or more predefined styled display elements into the graphic display. The method can further include allowing a user to determine a visual layout for the one or more graphic displays.

DETAILED DESCRIPTION

Figure 1A:
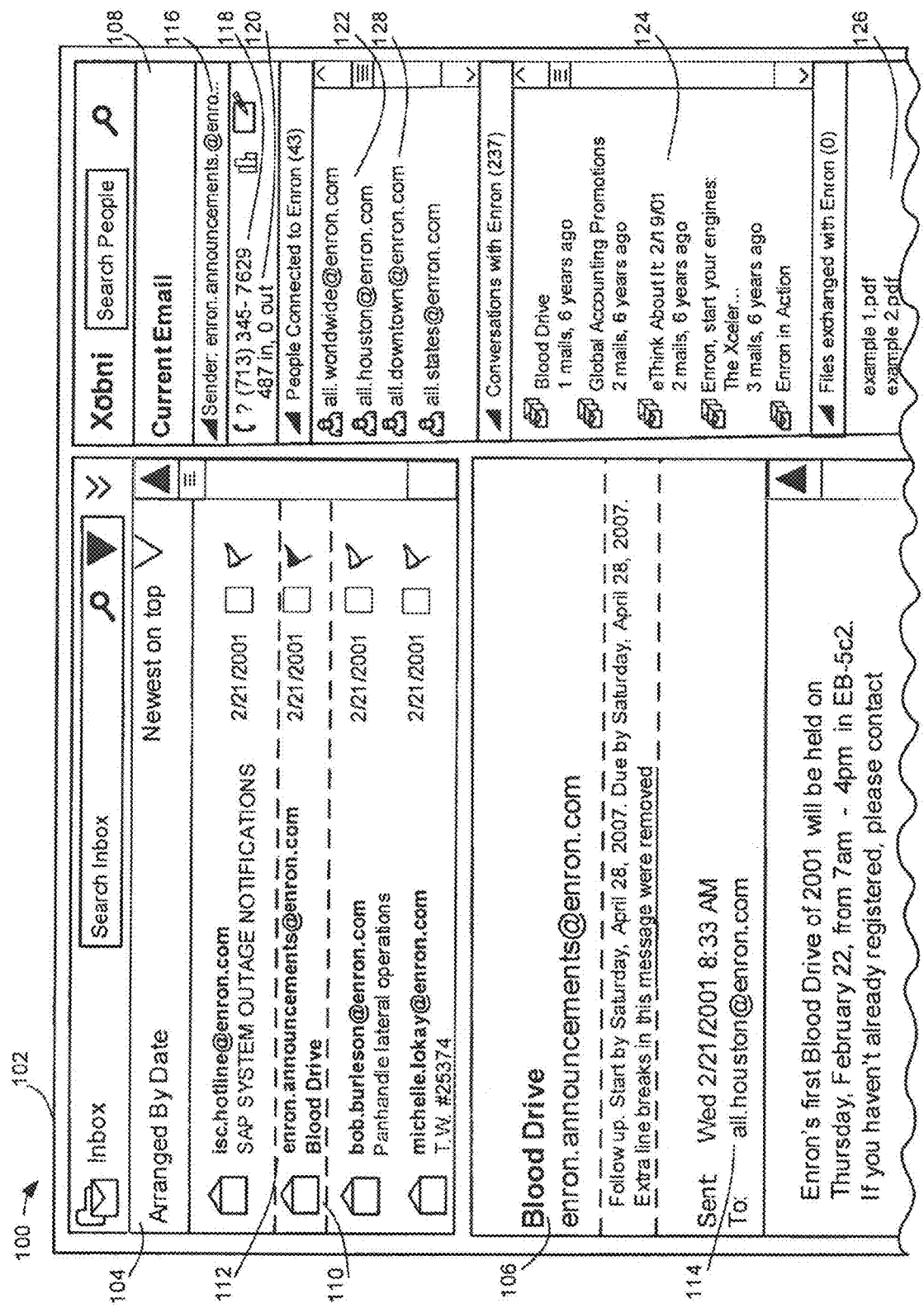
FIG. 1A shows an example e-mail client with a profile side bar.

FIG. 1A shows an example system 100 for displaying a profile containing information about communications to, from, and involving an individual. The system 100 includes an e-mail client 102 which can include an inbox viewing panel 104 and an e-mail viewing panel 106. The e-mail client 102 can be a standard stand alone e-mail client such as Microsoft Outlook or Eudora. In an alternate implementation the e-mail client 102 can be a web based e-mail client such as Yahoo! mail or Gmail that is viewed using a web browser. The e-mail client 102 can allow a user to view a list of e-mails in the inbox viewing panel 104. The user can select an e-mail in the inbox viewing panel 104 causing the e-mail client 102 to display the selected e-mail in the e-mail viewing panel 106.

In some implementations, instead of an e-mail client, the system 100 can include an instant messaging client, a social network client, a text message client, or another communication viewing client. It is to be understood that while portions of this description describe systems and methods involving e-mail communications, these same systems and methods can be implemented using other forms of communication, including instant messages, phone calls, text messages, Internet message board postings, social network messages or comments, or voice over IP communications.

The e-mail client 102 also includes a profile 108. In the example depicted, the profile 108 is displayed as an additional panel within the e-mail client 102 positioned to the right of the inbox viewing panel 104 and the e-mail viewing panel 106. This additional panel is sometimes referred to as a side bar. In some implementations, the profile 108 can be located at the top, bottom, left side, or any other location within the e-mail client 102. In still some implementations, the profile 108 can be displayed in a stand alone window, in a pop-up bubble displayed over a portion of the e-mail client 102, or integrated as part of one of the other viewing panels displayed by the e-mail client 102. For example, a pop up bubble containing a profile 108 can appear when an e-mail is selected in the inbox viewing panel 104, when an e-mail address or portion of text in the e-mail viewing panel 106 is selected, or when a mouse icon is moved over an e-mail address, name, icon, or portion of text. In another example, information can be integrated as part of the body of an e-mail, such as inserting a picture next to a person's name in the body of an e-mail, or inserting a person's name next to a phone number in an e-mail or attachment.

The profile 108 can contain information relating to a sender of an e-mail, a recipient of an e-mail, the body of an e-mail, an attachment to an e-mail, or a person or topic mentioned in an e-mail. In alternate implementations, the profile 108 can contain information related to a sender, recipient, body, attachment or topic of another communication medium such as an instant message, a phone call, a text message, an Internet message board, a social network message or comment, or a voice over IP communication. The user can implicitly request information to be displayed in the profile 108 by selecting an e-mail in the inbox viewing panel 104 or selecting text within a header or body of an e-mail in the e-mail viewing panel 106. In some implementations, the profile can include additional information (e.g., derived information such as search results derived from a topic mentioned in a communication).

In some implementations, the profile 108 can display information about an entity other than a person. For example, a communication may be received from an automated system, such as from a travel website, on-line retailer, an advertising service, or a mailing list. The profile 108 can display information related to the sender of the communication. For example, if the communication received has been sent from a travel website, information related to the travel website, or other communications from the travel website can be displayed. In another example, if the communication received has been sent from an mailing list, information related to the mailing list, or other communications received from the mailing list can be displayed. As yet another example, if the communication received has been sent from a business entity, information about the business entity (e.g., address, telephone number, contact person name) can be included in the profile.

For example, the user can select an e-mail 110 in the inbox viewing panel 104 causing the profile 108 to display information related to a sender 112 of the e-mail 110. In another example, the user can select an e-mail address 114 or name of a recipient of the e-mail 110 in order to display information related to the recipient in the profile 108. In another example, the user can select an attachment to the e-mail 110 in order to display information related to the attachment in the profile 108. In yet another example, the user can select the name of a person, a user name of a person, or a particular topic listed in a header, a body, or an attachment of the e-mail 110 in order to display information related to the person or topic in the profile 108.

In some implementations, the system 100 can determine if the user has made an implicit request to view information in the profile 108 by tracking, for example, user input of the form of mouse movements, mouse locations, keyboard strokes, mouse clicks, or active windows. Implicit requests to view information in the profile 108 can include opening, viewing, reading or writing an e-mail or other communication medium. For example, if the user starts to compose an instant message, the profile 108 can display information related to the recipient of the instant message. In another example, if the user views a social network profile, either within the e-mail client 102 or in a separate web browser, the profile 108 can display information related to a person associated with the social network profile.

In some implementations, selecting an e-mail or communication for which a person is a recipient of the e-mail or communication can cause a profile 108 for the person to be displayed. For example, selecting an e-mail addressed to Steve Jones can cause a profile for Steve Jones to be displayed. In some implementations, selecting an e-mail or communication on which a person has been copied (for example in a CC or BCC field) can cause a profile 108 for the person to be displayed. In some implementations, putting a person's e-mail address in the To, CC, or BCC field of an e-mail or communication can cause a profile 108 for the person to be displayed. In some implementations, hovering a cursor or other selection tool over an e-mail where a person is listed in the To, From, CC, or BCC field can cause a profile 108 for the person to be displayed. In some implementations, typing a person's name can cause a profile 108 for the person to be displayed.

In some implementations, a profile 108 for a person can be displayed in response to the user clicking on or selecting the person's name or other identifying information. For example, the user can view a web page that lists participants in a marathon that includes several persons with which the user has communicated. The user can select one of the names from the list to cause a profile 108 for the selected name to be displayed. In another example, the user can view a list of instant message contacts in an instant message client. The user can select a screen name from the list of instant message contacts to cause a profile 108 for the selected contact to be displayed. In another example, the user can view a document that contains a list of e-mail addresses. The user can select one of the e-mail addresses to cause a profile 108 associated with the selected e-mail address to be displayed. In another example, the user can view a list of a person's social network friends on the person's social network profile. The user can then select a social network profile name from the displayed list of friends to cause a profile 108 associated with the selected social network profile name to be displayed.

In some implementations, the system 100 can be linked to a phone (e.g., voice over IP phone) used by the user. For example, the system 100 can include means for detecting when the user makes or receives a phone call or text message using the phone and display information related to a recipient or initiator of the phone call or text message in the profile 108. In some implementations, the user can make a specific request to view information in the profile 108 by performing a search for a person's name or other identifying information. In some implementations, the system 100 can display more than one profile in response to any of the above described actions.

In the example depicted in FIG. 1A, the user has selected the e-mail 110 in the inbox viewing panel 104 and header information and a portion of the body of the e-mail 110 is displayed in the e-mail viewing panel 106. The e-mail 110 was received from the sender 112. The system 100 has determined that the user has made an implicit request to view information related to the sender 112 by selecting the e-mail 110. In response to this implicit request, the system 100 displays in the profile 108 information related to the sender 112.

In the example, the information displayed in the profile 108 includes an e-mail address 116, a phone number 118, communication statistics 120, a contact network 122, a conversation list 124, and a files exchanged list 126. In some implementations, the profile 108 can display additional contact information such as name, screen names, social network profile names, social network profile URLs, physical addresses, website URLs, additional e-mail addresses, or additional telephone numbers.

In the example, the communication statistics 120 include the number of e-mails received from the sender 112 and the number of e-mails sent to the sender 112. In some implementations, additional communication statistics 120 can be displayed, including times of communications, dates of communications, types of communications, volume of communications, length of communications, or speed of responses. For example, a statistic for the average amount of time it takes the sender 112 to respond to e-mails sent by the user can be displayed. In another example, the times of day that the sender 112 is most likely to respond to an e-mail or other form of communication can be displayed as a communication statistic 120. In another example, a statistic can be displayed that lists the percentage of communications between the user and the sender 112 that occur using a telephone, the percentage of communications that occur using instant messaging, the percentage of communications that occur using e-mails, or the percentage of communications that occur using a social network website as a percentage of all communications between the user and the sender 112. In another example, the number of communications sent or received on which the sender 112 has been copied can be displayed as a communication statistic 120. In another example, the number of communications received by the user on which the sender 112 has also been listed as a recipient can be displayed as a communication statistic 120.

In some implementations, the communication statistics 120 that are displayed can be chosen by the user. The user can choose to have a default set of communication statistics displayed, or the user can select which individual communication statistics 120 are to be displayed. The user can choose to have the same set of communication statistics 120 displayed for each profile 108 or the user can choose to have a different set of communication statistics 120 displayed depending on which person or topic the currently displayed profile 108 is associated with.

The contact network 122 displayed in the profile 108 shows a list of contacts 128 that are associated with the sender 112. In the example depicted, the contacts 128 are shown as e-mail addresses. In some implementations, the contacts 128 can be listed as names, screen names, nick names, employee numbers, social network profile names, social network profile URLs, telephone numbers, website URLs, or any combination of these.

In some implementations, details about a contact 128 can be displayed adjacent to the contact 128 in the contact network 122. These details can include time since last communication, last form of communication, frequency of communications, total numbers of communications, or other related data.

The contacts 128 listed in the contact network 122 are contacts that are associated with the sender 112. The contacts 128 can include recipients of communications from the sender 112, recipients of communications of which the sender 112 is also a recipient, individuals named in a body or header of a communication with the sender 112, or individuals named in a document that is attached to a communication with the sender 112. For example, a person who was copied on an e-mail between the user and the sender 112 can be listed as a contact 128 in the contact network 122. In the example depicted, the header of the e-mail 110 as shown in the e-mail viewing panel 106 lists all.houston@enron.com as a recipient of the e-mail 110. The contact network 122 lists all.houston@enron.com as a contact 128 of the sender 112. In another example, if the user receives an e-mail from the sender 112 with the subject line "Matt Smith's birthday party", Matt Smith can be listed as a contact 128 in the contact network 122 even if Matt Smith has never been included in or been the recipient of any communications between the user and the sender 112. In another example, if the user posts a comment to a social network profile page belonging to the sender 112 and a person named Eric Johnson has also posted a comment to the social network profile page, or is listed as a friend of the sender 112 on the social network profile page, Eric Johnson can be listed as a contact 128 in the contact network 122.

In some implementations, the contacts 128 listed in the contact network 122 can be collected from sources other than communications between the user and the sender 112. In one implementation, the sender 112 can provide a list of contacts to the user to include in the contact network 122 for the sender 112. The sender 112 can provide the list of contacts to the user through sharing the list of contacts on a shared network, or by sending a communication to the user with, for example, the list of contacts in a body of the communication or in an attachment to the communication.

In some implementations, the system 100 can collect data from outside sources in order to determine contacts 128 to be listed in the contact network 122. The system 100 can query various sources to extract information on contacts that can be associated with the sender 112 and listed in the contact network 122. Sources of information that can be queried to derive contacts associated with the sender 112 can include web search engines, people search engines, social networks, personal web pages, telephone directories, scanned business card data or company website profiles.

For example, the system 100 can perform a search of a social network based on the sender 112's name, e-mail address, screen names or other information about the sender 112. The system can then identify a profile page on the social network belonging to the sender 112. Any contacts that are publicly listed on the social network profile page can be listed in the contact network 122 of the sender 112 even if the user has never communicated with the sender 112 using the social network or viewed the profile page of the sender 112 on this social network. In some implementations, the system 100 can access and extract contacts listed on a private social network profile page belonging to the sender 112 if the user has proper access information or authorization to view the private social network profile page of the sender 112.

In another example, the system 100 can use a search engine to perform a search based on the sender 112's name, e-mail address, screen names or other information about the sender 112 in order to identify web pages that may contain contacts that can be associated with the sender 112. For example, the system 100 can use a search engine to perform a search based on the sender 112's name. If one of the search results returned is for a blog written by a person named Mark Adams that mentions the sender 112, then Mark Adams can be listed as a contact 128 in the contact network 122. In another example, the system 100 can determine that the sender 112 works for the same company as a person who has sent a different communication to the user. This person can then be listed as a contact 128 of the sender 112. In some implementations, the system 100 can collect data using a peer to peer network.

Information that can be used to collect information about contacts 128 or other information displayed in the profile 108 can include e-mail addresses, names, screen names, social network profile names, phone numbers, personal website URLs, social network profile URLs, or physical addresses.

The contacts 128 displayed in the contact network 122 can be listed in order based on a ranking system. Criteria used to rank the contacts 128 can include total volume of communication, volume of communication over a period of time, length of communications, importance level of communications, types of communications, contents of communications, time of communications; methods by which the contacts 128 were determined to be associated with the sender 112, or any combination of these. For example, the contacts 128 can be ranked based on the total number of communications between the user and the sender 112 for which a contact is also a recipient of the communication. In another example, the contacts 128 can be ranked based on the number of communications between the user and the sender 112 for which a contact is also a recipient of the communication over the course of the last three weeks. In another example, the contacts 128 can be ranked based on the number of communications between the user and a contact for which the sender 112 is also a recipient of the communication.

In another example, the contacts 128 can be ranked based on the length of communications between the user and the sender 112 for which a contact is also a recipient of the communication with longer communications being ranked higher than shorter communications. In another example, contacts that are listed on communications flagged as urgent or important can be ranked higher than other contacts. In another example, the user can choose to have contacts who mainly communicate with the user or sender 112 using e-mail ranked higher than contacts who mainly communicate with the user or sender 112 using instant message or social networks. In another example, the system 100 can use the contents of communications involving each contact 128 and the sender 112 to determine if communications involving the contact 128 and the sender 112 are primarily business related or social related communications. The system 100 can then give a higher ranking to contacts associated with business communications than contacts associated with social communications.

In another example, contacts who are associated with more recent communications between the user and the sender 112 can be ranked higher than contacts associated with older communications between the user and the sender 112. In another example, contacts that have been determined to be associated with the sender 112 based on e-mail communication can be ranked higher than contacts that have been determined to be associated with the sender 112 based on web searches.

In some implementations, each contact 128 listed in the contact network 122 can be a link to more information about the contact 128. For example, if a contact 128 is clicked on, selected, or interacted with by the user, a profile containing information about the selected contact 128 can be displayed. In another example, the user can hover a mouse cursor or other selection tool over a contact 128. This can cause a pop-up bubble containing additional information about the contact 128 to be displayed.

The conversation list 124 can display a list of recent communications between the user and the sender 112 or involving the user and the sender 112. The communications displayed on the conversation list 124 can be a list of past e-mails, text messages, instant messages, telephone calls, social network communications, message board posts or voice over IP communications involving the sender 112. In some implementations, the conversation list 124 can be a list of recent conversation threads involving the sender 112. A conversation thread is a series of communications that can be grouped together. For example, a series of e-mails having the same or similar subjects can be grouped together as a conversation thread. In another example, a group of instant messages between the sender 112 and the user that occurred over a specific period of time can be grouped together as a conversation thread. For example, if the user sent and received a series of instant messages from the sender 112 over a three hour period earlier in the day, and that conversation was separated from another series of instant messages between the user and the sender 112 by a period of 2 hours, the instant messages that were sent and received during that three hour period can be grouped together as a conversation thread. In another example, a series of telephone calls between the user and the sender 112 that occurred during a set time period can be grouped together as a conversation thread.

The communications or conversation threads displayed in the conversation list 124 can be listed in order based on a ranking system. In one implementation, conversation threads can be listed in order of most recent communications to oldest communications. In some implementations, conversation threads can be listed in order of oldest to most recent. In some implementations, conversation threads can be listed in order of importance with conversation threads containing communications marked as urgent being ranked higher than conversation threads with fewer communications marked urgent or no communications marked urgent. In some implementations, the system 100 can determine which conversation threads are work related and which conversation threads are social. The conversation threads that are work related can then be ranked higher than the conversation threads that are social. In some implementations, conversation threads can be ranked based on the number of communications in the conversation thread.

Communications that are listed in the conversation list can include communications initiated by the sender 112, communications for which the sender 112 is a recipient, communications on which the sender 112 has been copied, or communications in which the sender 112 is mentioned.

In the example depicted in FIG. 1A, the conversation list 124 displays a list of recent conversation threads involving the user and the sender 112. The conversation threads displayed are for recent e-mail communications involving the user and the sender 112. The e-mails in each conversation thread are grouped by subject. The conversation list 124 displays the subject for each conversation thread, the number of e-mails in each conversation thread, and the amount of time that has passed since the last communication for this conversation thread was sent or received. In some implementations, additional information can be displayed for each conversation thread, including: time and date of the last communication in the conversation thread, time and date of the first communication in the conversation thread, other contacts involved in the conversation thread, average length of communications in the conversation thread, total number of people involved in the conversation thread, level of importance of the communications in the conversation thread, attachments shared in the conversation thread, calendar events related to the conversation thread, other forms of communication related to the conversation thread, relevant web data, or average response time of communications in the conversation thread.

In some implementations, the conversation list 124 can display a summary or the first few lines of the most recent communication for each conversation list. In some implementations, the conversation list 124 can display a summary or the first few lines of the first communication for each conversation list. In some implementations, the conversation list 124 can display a summary or the first few lines of the last communication initiated by the sender 112 for each conversation list.

The files exchanged list 126 displays a list of files that were attached to communications involving the user and the sender 112. This can include communications initiated by the user for which the sender 112 was a recipient, communications initiated by the sender 112 for which the user was a recipient, or communications initiated by a third party for which the sender 112 and the user were both recipients. The files exchanged list 126 can also include files that were exchanged between the user and the sender 112 without using a communication medium. For example, the files exchanged list 126 can include files that were transferred from the sender 112's network drive to the user's computer or network drive. In another example, the files exchanged list 126 can include files that were transferred to the user's computer or network drive from an external hard drive, flash drive, or floppy disk belonging to or populated by the sender 112.

The files displayed in the files exchanged list 126 can be listed in order based on a ranking system. In one implementation, files can be listed in order of most recently received files to least recently received files. In some implementations, files can be listed in order of oldest to most recent. In some implementations, files can be listed in order of importance, with files that were attached to communications marked as urgent being ranked higher than files attached to communications that were not marked as urgent. In some implementations, the system 100 can determine which files are work related and which files are personal. The files that are work related can then be ranked higher than the files that are personal. In some implementations, files can be ranked based on the size of the files.

In some implementations, the files displayed in the files exchanged list 126 can be grouped together. The files can be grouped together based on the subject of the communications to which the files were attached, file name, file title, date of the file, date of the communication, file type, or subject matter of the file. For example, if a document has undergone several rounds of revisions, the different versions of the document can be grouped together so that the different versions of the document can be easily compared to one another. In another example, a number of files about rain forests can be grouped together since they all contain related subject matter. In another example, all image files can be grouped together so that they can be more easily viewed, or easily put into a slide show. For example, a group of image files can be displayed as a slide show and each slide can contain additional information about the image being displayed, such as who sent the image, recipients of the image, the date the image was sent or received, or other information drawn from one or more communications to which the image was attached.

Figure 1B:
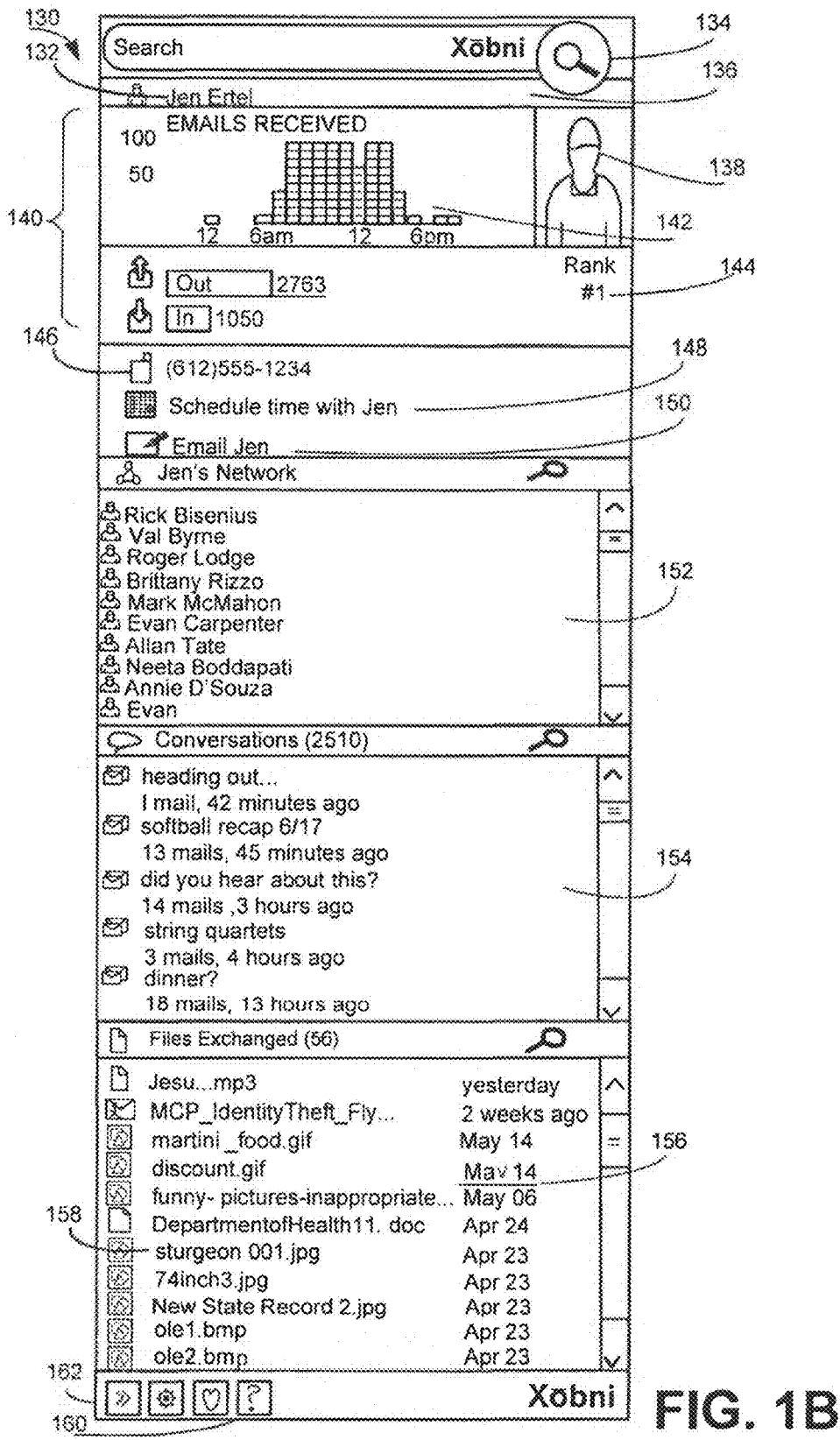
FIG. 1B shows an example of a profile.

FIG. 1B shows a profile 130 for a person 132 named "Jen Ertel". The profile 130 for the person 132 can be displayed in response to an action by a user that indicates either an implicit or direct request to view the profile 130 of the person 132. Actions by the user that can cause the profile 130 for the person 132 to be displayed can include viewing or selecting a communication sent by the person 132, viewing or selecting a communication for which the person 132 is listed as a recipient, composing or initiating a communication with the person 132, selecting or clicking on a name, screen name, or e-mail address of the person 132, or performing a search for information related to the person 132.

The profile 130 includes a search bar 134. The search bar 134 can be used to request that information be displayed about a particular person, topic, conversation thread, communication, or file. For example, a search performed using the search bar 134 and the search string "Allan Tate" can result in a profile for a person named Allan Tate being displayed. In another example, a search using the search string "sunday_presentation.ppt" can result in information about a file named "sunday_presentation.ppt" being displayed. In another example, a search using the search string "2002 Sales Goals" can result in information to be displayed regarding communications with the subject "2002 Sales Goals", containing the phrase "2002 Sales Goals", or having attachments that contain the phrase "2002 Sales Goals".

Search criteria that can be used to identify a profile can include names, screen names, social network profile names, social network profile URLs, physical addresses, website URLs, e-mail addresses, e-mail subject lines, file names, or telephone numbers. For example, a search using the search string "allan.tate@example.com" can result in a profile for a person named "Allan Tate" being displayed. In the example depicted in FIG. 1B, a search for the phone number "(612) 555-1243" may have been performed in-order to display the profile 130 for the person 132 named "Jen Ertel".

The profile 130 can include a title bar 136. The title bar 136 can display a name, a nick name, a screen name, a primary e-mail address, or other identifying title for the person 132 so that the user can easily identify who the information in the profile 130 is related to.

The profile 130 can also include an image 138. The image 138 can be a picture of the person 132 to help the user more easily identify who the information in the profile 130 is related to or to help the user identify whom he or she is communicating with. For example, if the user receives an instant message from a person with the screen name "summergirl" the user may not be able to remember who this screen name belongs to. When the instant message is received, the profile 130 can display information about the person with the screen name "summergirl" including a picture of the person as the image 138. This can help the user to identify whom he or she is communicating with. The image 138 can also be an image, icon, or picture associated with the person 132. The image, icon, or picture can be used to identify the person 132 as a business contact, co-worker, friend, social acquaintance, client, or contractor. For example, all of the profiles 130 for contacts from a particular company can display a logo for that company. This can help the user to quickly identify what relationship he or she has with these particular contacts.

The image 138 can be added to the profile 130 by the user, or it can be automatically extracted from a communication with the person 132 or from a website or profile page belonging to or about the person 132. For example, if a social network screen name or URL for the person 132 is known, an image from the person 132's social network profile page can be extracted and used as the image 138. In another example, if instant message communications with the person 132 include an icon that identifies the person 132, this instant message icon can be extracted and used as the image 138.

The profile 130 can include communication statistics 140 about communications involving the person 132. These communication statistics 140 can include the statistics as previously described for FIG. 1A. In the example shown in FIG. 1B, one of the communication statistics 140 displayed is a graph 142 showing what times of day communications are received from the person 132 and the relative volume received from the person 132 at each time of day. This can help the user to determine when, or how quickly the person 132 will respond to a new communication from the user. For example, if the user lives in the United States and the person 132 lives in Germany, most of the communications received from the person 132 may occur between 5:00 am and 10:00 am of the user's local time. The graph 142 can easily display this information so that the user can determine when to reasonably expect a response to a recent communication from the person 132.

Other communication statistics 140 displayed in the profile 130 in FIG. 1B include the total number of communications received from the person 132, the total number of communications sent to the person 132, and a rank 144. The rank 144 can be the rank of the person 132 compared to all other persons that the user communicates with. The rank 144 can be based, for example, on total communications exchanged, total number of attachments exchanged, total number of communications sent, total number of communications received, length of communications or importance of communications.

Communication statistics 140 can be displayed as graphs or charts as shown in FIG. 1B, or as text. In some implementations, statistics can be displayed in the profile 130 or in an additional panel or pop-up window as "fun facts". For example, when viewing a profile for someone named "Matt Miller", the profile can display a message that reads "Matt's birthday is next week". In another example, a pop-up bubble with the message "Your last communication with Matt was 21 days ago" can be displayed. In another example, a panel can display a message reading "You send Matt 20 times as many messages as he sends you."

Another example of a fun fact that can be displayed is "Matt is your $5^{th}$ most e-mailed contact". Another example of a fun fact that can be displayed is "your most e-mailed contact is Steve.'. Another example of a fun fact that can be displayed is "the fastest responder to your communications is Garrett." The fun facts can include any combination of communication statistics, communication information, contact information, or contact statistics.

In some implementations, communication statistics 140 can be shared with other persons. For example, the user can choose to share communication statistics with the person 132. The person 132 will then be able to view communication statistics 140 about his or her communications with the user. In some implementations, the user can indicate that one or more persons are trusted contacts. Communication statistics 140 can be automatically shared with all persons indicated as trusted contacts. Other information, such as calendar information, contact information, or contact network information can also be shared with trusted contacts.

The profile 130 can include contact information 146. The contact information 146 displayed can include e-mail addresses, telephone numbers, screen names, social network profile names, social network profile URLs, physical addresses, facsimile numbers, or website URLs. The contact information 146 can be collected from a variety of sources including communications between the person 132 and the user, communications between the user and other persons, e-mail body text, e-mail meta data, e-mail header information, e-mail attachments, web search engines, people search engines, social networks, e-mail clients, instant messages, personal web pages, telephone directories, scanned business card data, text messages, picture sharing websites, video sharing websites, profile pages, telephone communications, or customer relationship management systems. For example, when the user receives an e-mail from a person, that person's e-mail address can be added to the list of contact information 146 for that person's profile 130. In another example, when the user makes a phone call to a person, that person's telephone number can be added to the list of contact information 146 for that person's profile 130.

In some implementations, contact information 146 can be extracted from the body, subject, or meta data of a communication between the user and the person 132. For example, if the user receives an e-mail from the person 132 with a signature block at the end that includes a telephone number, facsimile number, and screen name for the person 132, this contact information can be extracted from the e-mail and added to the list of contact information 146 for the person 132's profile 130. In another example, an e-mail from a person can include an address for the person in the body of the e-mail or in an attachment to the e-mail, this address can be extracted from the e-mail or attachment and added to the list of contact information 146 for that person's profile 130. In another example, the person 132 can leave a social network post for the user telling the user the person 132's instant message screen name, this screen name can be added to the list of contact information 146 for the person 132's profile 130.

In some implementations, contact information 146 for the person 132 can be extracted from a communication from a third party. For example, the user can receive an e-mail from Bill that contains the text "Mary's cell phone number is 608-555-5353". This phone number can be extracted from Bill's e-mail and added to the list of contact information 146 for Mary's profile 130. In another example, the user can receive an e-mail with an attachment that contains a list of telephone numbers, e-mail addresses, and office numbers for everyone in the user's office. The telephone number, e-mail address, and office number for each person listed on the attachment can be extracted and added to the list of contact information 146 for the profiles 130 of each person listed on the attachment.

Contact information 146 can be extracted from multiple sources, including multiple e-mail clients, multiple web mail systems, multiple instant message clients, multiple telephone numbers, multiple social networks, or multiple web pages.

In some implementations, contact information 146 can be collected using search engines, telephone directories, or people search engines. Search criteria can include e-mail addresses, names, screen names, social network profile names, phone numbers, personal website URLs, social network profile URLs, facsimile numbers or physical addresses. For example, a search of a telephone directory or people search engine for "Rex Banner" can return a telephone number for Rex Banner. This telephone number can then be added to the list of contact information 146 for Rex Banner's profile 130. In another example, a people search or web search for the e-mail address "alewis@example.com" can return a URL for a social network profile for Adam Lewis. The name "Adam Lewis" can then be associated with the e-mail address "alewis@example.com" in a profile 130. In addition, the social network profile URL and social network screen name for Adam Lewis can be added to the list of contact information 146 for Adam Lewis's profile 130. Furthermore, additional contact information, that is listed on the social network profile for Adam Lewis, such as additional e-mail addresses, phone numbers, instant message screen names, etc., can be extracted from the social network profile and added to the list of contact information 146 for Adam Lewis's profile 130.

In another example, a web search or person search for a person can return a photo or video sharing website profile for the person. The URL or screen name for the person's photo or video sharing website profile can be added to the list of contact information 146 for the person's profile 130. In addition, the photo or video sharing website may contain additional contact information for the person that can be extracted and added to the list of contact information 146 for the person's profile 130.

In another example, contact information 146 for the person 132 can include an e-mail address "jertel@examplecompanyltd.com". A web search can be performed to identify the website associated with the e-mail extension "examplecompanyltd.com". For example, this e-mail extension can be associated with a company called "Example Company ltd.". The website for Example Company ltd. can then be searched for information about the person 132. The website may include a profile page for the person 132 that includes contact information that can be added to the list of contact information 146 for the person 132's profile 130. In addition, the URL for the profile page can be added to the list of contact information 146 for the person 132's profile 130.

In some implementations, the address for a person can be used to refine the search results for that person by constricting the results to information about persons in a specific geographic area. For example, if a search is being performed for information on a person with a common name, such as "Bill Johnson", and Bill Johnson's address is known, the search results can be refined by restricting the results to information about person's named Bill Johnson in the city of the known address. In some implementations, other information about a person can be used to refine search results for that person.

In some implementations, contact information can be extracted from a shared network drive or through a secure connection. In some implementations, contact information can be automatically shared between systems. For example, the person 132 can elect to share contact information with all people in a trusted network, such as all people with e-mail extensions from the same company. A computer belonging to the person 132 can then automatically send contact information to all trusted people. If the user is in the network of trusted people, the person 132's contact information will automatically be shared with a computer or system belonging to the user.

In some implementations, contact information for the person 132 can be manually added or removed from the profile 130 by the user. In some implementations, contact information for the person 132 can be manually added or removed from the profile by the person 132 or by a third party. In some implementations, the user can choose which contact information for each person is displayed in that person's profile.

In some implementations, when a mouse cursor or other selection tool is hovered over/indicates a piece of contact information in the list of contact information 146, a pop-up bubble or other indicator can be displayed which indicates the source from which the piece of contact information was received or extracted. For example, if a phone number has been extracted from an e-mail, a hover bubble can be displayed which shows the e-mail or a portion of the e-mail where the phone number was extracted with the extracted info highlighted or demarcated in some way.

In some implementations, the user can be allowed to validate contact information in the list of contact information 146. Validated contact information can be indicated as validated, and un-validated contact information can be indicated as un-validated. For example, if a phone number for the person 132 is extracted from an e-mail, the user can look at the phone number to determine if it is indeed the correct phone number for the person 132. If the user believes that the phone number is correct, the user can choose to validate the phone number. The phone number can then be displayed along with an indication that it has been validated, such as with a check mark icon, or text that reads "valid". If the user is unsure if the phone number is correct, or has not taken the time to validate the phone number, the phone number can be displayed with an indication that it has not been validated, such as with a question mark icon, or the text "not validated".

In some implementations, presence of the person 132 can be indicated for some or all of the contact information on the list of contact information 146. For example, an indicator next to a person's instant message screen name can indicated if the person is currently logged onto the related instant message network. In another example, an indicator next to a person's social network screen name or URL can indicate if the person is currently logged onto the related social network or if the person has made a recent update to his or her social network profile. In another example, an indicator next to a person's e-mail address can indicate if the person has put up an away message or out of the office message.

In some implementations, the profile 130 can display information about the person 132's current location. If the person 132 is in possession of a GPS unit, GPS enabled phone, or other location detection device, the person 132 can choose to share his or her location information. There are several services that allow a person to share location information with other people. The person 132 can choose to share his or her location information with the user. The profile 130 can then display the current location of the person 132. This location information can be displayed as an address, map coordinates, or a graphic of a map with an icon to indicate the person 132's present location.

Other information about the person 132 that can be displayed on the profile 130 can include birthday, gender, age, job title, employer, universities attended, family information, or other biographical data. Information from Customer Relationship Management Systems (CRMs) about or related to the person 132 can also be displayed in the profile 130. Information about calendar items or scheduled meetings related to the person 132 or related to a communication can also be displayed as part of the profile 130.

In some implementations, information from one or more websites can be displayed as a chronological feed of information in the profile 130. This information can be queried on the web via one or more search engines or from one or more specific websites through established associations between the person 132 and the one or more websites. For example, this information can be found by general searching, people searching, or querying websites where it has been established that the person 132 is generating content or is the subject of content on the website. Search terms for these searches can include e-mail addresses, names, screen names, social network profile names, phone numbers, personal website URLs, social network profile URLs, or physical addresses. Information that is extracted from communications with the person 132 can also be used as search criteria.

The profile 130 can include a schedule time link 148. The user can click on/interact with the schedule time link 148 to send a communication to the person 132 to request a meeting or to send the user's schedule to the person 132. For example, clicking on the schedule time link 148 can cause an e-mail to be automatically composed that is addressed to the person 132 that contains all of the times over the course of the next week that the user is available during business hours. This schedule information can be extracted from a calendar associated with an e-mail client, web mail account, social network account, instant messaging program, telephone, personal digital assistant (PDA), or website belonging to the user or associated with the user. In addition, schedule information can be extracted from a calendar stored on a computer, network drive, or other data storage location belonging to or associated with the user. In one implementation, clicking on the schedule time link 148 can cause a communication to be sent to the person 132 requesting schedule information from the person 132.

The profile 130 can also include one or more initiate communication links 150. In the example shown in FIG. 1B, the initiate communication link 150 displayed will cause an e-mail addressed to the person 132 to be automatically generated when it is clicked on. Other forms of communication that can be initiated using an initiate communication link 150 include telephone calls, instant messages, text messages, social network messages, social network posts, message board posts, facsimiles, or voice over IP communications. For example, the profile 130 can include a "call Jen" link that can cause the user's cell phone to dial Jen's phone number when clicked on. In another example, the profile 130 can include an "instant message" link that when clicked on, can cause an instant message program to automatically open and generate an instant message addressed to a screen name of the person 132.

The profile 130 can include a contact network 152. The contact network 152 can include a list of contacts associated with the person 132. The contact network 152 can be populated using the methods previously described in the description of FIG. 1A. The profile 130 can also display the total number of contacts associated with the person 132 in the contact network 152. In the example shown in FIG. 1B, the contact network 152 displayed in the profile 130 indicates that there are 50 contacts in Jen's contact network 152.

Clicking on, selecting, or interacting with one or more contacts from the contact network 152 can cause one or more actions to occur. In one implementation, selecting a contact from the contact network 152 can cause a profile for that contact to be displayed. In some implementations, selecting one or more contacts from the contact network 152 can cause a communication directed to the selected contacts to be initiated. For example, selecting three contacts from the contact network 152 can cause an e-mail addressed to the three contacts to be generated. In another example, clicking on three contacts from the contact network 152 can cause the user's telephone to initiate a conference call with the selected contacts. In some implementations, selecting one or more contacts from the contact list can cause a communication directed to the selected contacts and the person 132 to be generated.

In some implementations, selecting a contact from the contact network 152 can cause the most recent communication or conversation thread between the user and the selected contact to be displayed. In some implementations, selecting a contact from the contact network 152 can cause the most recent communication or conversation thread involving the contact, the person 132, and the user to be displayed. In some implementations, moving a mouse cursor over a contact in the contact network 152 can cause information about the contact to be displayed. For example, moving a cursor over a contact can cause a small pop-up bubble to appear that displays the contact's phone number, e-mail address, or other contact information. In some implementations, contacts can be manually added or removed from the contact network 152 by the user.

The profile 130 can include a conversation list 154 that includes a list of recent communications or conversation threads involving the user and the person 132 as previously described in the description of FIG. 1A. The conversation list 154 can display the total number of communications or conversation threads involving the user and the person 132. In the example shown in FIG. 1B, the conversation list 154 indicates that 2510 conversation threads have occurred that involved the user and the person 132.

Clicking on or selecting a conversation thread or communication in the conversation list 154 can cause a more detailed summary of the conversation thread or communication to be displayed. For example, selecting a conversation thread can cause a summary of one or more communications in the conversation thread to be displayed. In another example, selecting a communication in the conversation list 154 can cause a summary of the communication to be displayed. In some implementations, selecting a communication in the conversation list 154 can cause the communication to be displayed. For example, selecting an e-mail from the conversation list 154 can cause the e-mail to be displayed.

In some implementations, selecting a conversation thread can cause the most recent communication to be received or the most recent communication to be sent in that conversation thread to be displayed. In some implementations, selecting a conversation thread in the conversation list 154 can cause the first communication in that conversation thread to be displayed. In some implementations, selecting a conversation thread from the conversation list 154 can cause a communication addressed to all of the participants of the conversation thread to be generated. For example, selecting an e-mail conversation thread can cause an e-mail to be automatically generated that is addressed to all of the e-mail addresses involved with the selected conversation thread.

In some implementations, communications or conversation threads can be manually added or removed from the conversations list 154 by the user.

The profile 130 can include a files exchanged list 156. The files exchanged list 156 can contain a list of files exchanged between the user and the person 132 as previously described in the description of FIG. 1A. For each file listed in the files exchanged list 156, the profile 130 can display a file name, a file title, an icon, the time or date when the file was received, the amount of time that has elapsed since the file was received, the subject of the communication to which the file was attached, or other information about the file. Icons displayed next to a file name or file title can indicate what type of document the file is. In the example depicted, a file 158 with the file name "sturgeon 001.jpg" is displayed. An icon next to the file name for the file 158 indicates that the file 158 is a picture file. A date next to the file name indicates that the file 158 was received on April 23.

Clicking on or selecting a file in the files exchanged list 156 can cause the file to open. In some implementations, selecting a file can cause the communication to which the file was attached to be displayed. In some implementations, selecting a file can cause a list of files with the same file name to be displayed. This allows the different versions of a document that has undergone several rounds of revisions to be reviewed and compared to each other. This list of files can include a time and date stamp for each version of the file so that the most recent revision can be easily identified. In some implementations, selecting a file can cause a summary of the file to be generated and displayed. For example, hovering a cursor over a file in the files exchanged list 156 can cause an information bubble containing the title and first few lines of the file to be displayed. In some implementations, files can be copied from the files exchanged list 156 to other locations. In some implementations, files can be manually added or removed from the files exchanged list by the user.

The profile 130 can include one or more menu buttons 160. The menu buttons can be used to change personal settings or preferences, change viewing preferences, or access menus or help information. The profile 130 can also include a minimize button 162 that can cause the profile 130 to minimize or close. When the minimize button 162 is clicked or selected, a minimized version of the profile 130 that takes up less space in a viewing window can be displayed. The minimized version of the profile 130 can include a summary of some or all of the information displayed by the profile 130.

Figure 1C:
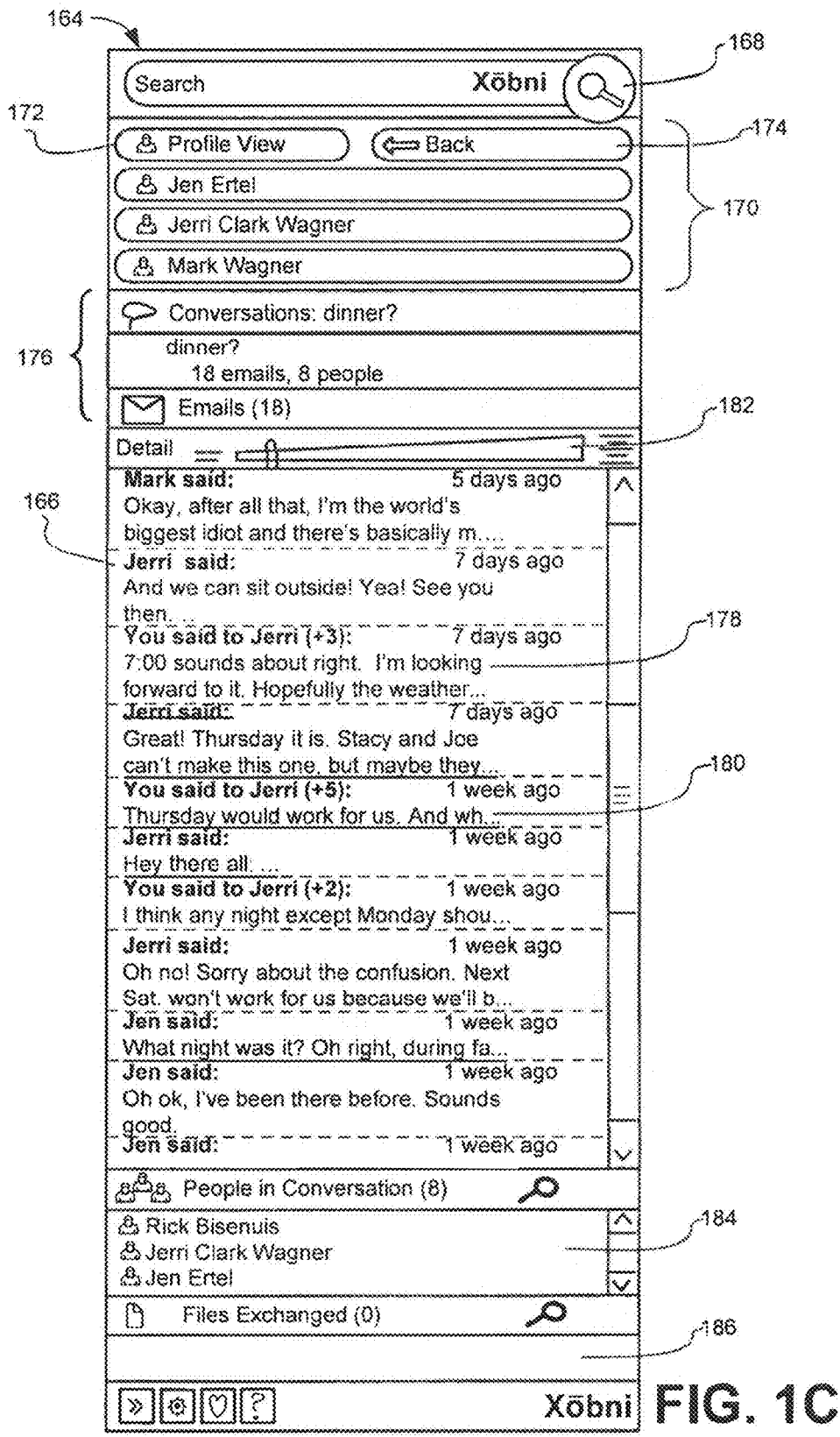
FIG. 1C shows an example of a conversation thread profile.

FIG. 1C shows a viewing panel 164. The viewing panel 164 can display a profile such as the profile 130 of FIG. 1B. The viewing panel 164 can also display information about communications, communication attachments, files, or conversation threads. In the example shown in FIG. 1C the viewing panel 164 displays information about a conversation thread 166 in the form of a conversation thread profile. The information about the conversation thread 166 can be displayed in response to a user clicking on a conversation thread 166 in a conversation list, such as the conversation list 154 from FIG. 1B. In some implementations, the conversation thread 166 can be displayed in response to the user viewing, reading, selecting, opening, writing, initiating, or receiving a communication that is part of the currently displayed conversation thread 166. For example, the user can select an e-mail such as the e-mail 110 from FIG. 1A. This can cause a communication profile containing information about the conversation thread 166 that includes the selected e-mail to be displayed. The communication profile can include information about the selected e-mail as well as other e-mails and communications involved in the same conversation thread 166 as the selected e-mail.

In another example, the user can view an instant message which can cause information about a conversation thread 166 which includes the instant message to be displayed. In another example, the user can receive a phone call that is a continuation of a conversation thread 166. This can cause a communication profile containing information about the conversation thread 166 that includes the received phone call to be displayed. In another example, the user can compose an e-mail that is a continuation of a conversation thread 166. This can cause a communication profile containing information about the conversation thread 166 that includes the e-mail to be displayed.

In some implementations, the conversation thread 166 can be displayed in response to a search performed by the user. For example, the user can use a search bar 168 to search for a conversation thread 166 based on the subject of the conversation thread 166, participants in the conversation thread 166, files attached to communications in the conversation thread 166, or key words or terms in the communications of the conversation thread 166.

The viewing panel 164 can include one or more navigation buttons 170. The navigation buttons 170 can include a profile view navigation button 172. The profile view navigation button 172 can be used to return the viewing panel 164 to a profile view so that the viewing panel 164 displays information about the sender or recipient of a currently selected communication, or another person as indicated by the user. The navigation buttons 170 can also include a back button 174. The back button 174 can be used to display a profile, conversation thread, or other information that was previously displayed in the viewing panel 164. For example, if the user was previously viewing a profile for a person named Mark Wagner, clicking on the back button 174 can cause the viewing panel 164 to display the profile for Mark Wagner. In another example, if the user was previously viewing information about an e-mail attachment, clicking on the back button 174 can cause the viewing panel 164 to display the previously viewed e-mail attachment information.

The navigation buttons 170 can also display a navigation history that has lead to the current information being displayed in the viewing panel 164. In the example shown in FIG. 1C, the navigation buttons 170 indicate that the user first viewed a profile for Jen Ertel. The user then viewed a profile for Jerri Clark Wagner. The user may have opened the profile for Jerri Clark Wagner by clicking on the name Jerri Clark Wagner in a contact network or list of contacts on Jen Ertel's profile, or by performing a search for Jerri Clark Wagner, or other information associated with Jerri Clark Wagner. The navigation buttons 170 indicate that the user then viewed a profile for Mark Wagner. The user may have caused the current conversation thread 166 to be displayed by clicking on a conversation thread in a conversation list similar to the conversation list 124 from FIG. 1A. In some implementations, clicking on or selecting any of the buttons in the navigation history can cause the viewing panel 164 to display the profile, conversation thread, communication, communication attachment, or other information associated with the selected navigation button 170.

The viewing panel 164 can include a title bar 176. The title bar 176 can include the type of information being displayed in the viewing panel, the subject, and other key information. When the information being displayed in the viewing panel 164 is a conversation thread 166, the title bar 176 can indicate that a conversation is being viewed, the title or subject line of the conversation thread, the number of communications involved in the conversation thread, the types of communications involved in the conversation thread, or the number of people involved in the conversation thread. In the example shown, the title bar 176 indicates that a conversation is being viewed, that the subject line of the communications in the conversation thread 166 is "dinner?", that there are 8 people involved in conversation thread 166, that 18 communications are included in the conversation thread 166, and that all 18 communications are e-mails.

The viewing panel 164 can include a summary of some or all of the communications 178 that make up the conversation thread 166. Information displayed as part of the summary for each communication 178 can include the sender of the communication 178, the recipients of the communication 178, the time or day that the communication 178 was sent or received, attachments to the communication 178, the first few lines or sentences of the communication 178, the importance of the communication 178, or the number of recipients of the communication 178. For example, an e-mail summary 180 indicates that the user sent an e-mail in response to an e-mail from Jerri 1 week ago and that 5 additional recipients were also listed on the e-mail. The e-mail summary 180 also displays the first lines of the e-mail sent to Jerri.

In some implementations, the communications 178 that make up the conversation thread 166 can be of various communication types. For example, a conversation thread can include a combination of e-mails, instant messages, and social network profile comments. In another example, a conversation thread can include a combination of phone conversation transcripts, text messages, and blog posts.

In some implementations, clicking on or selecting a communication summary in the conversation thread 166 can cause the related communication to be displayed. For example, clicking on the e-mail summary 180 can cause the e-mail sent from the user to Jerri to be displayed. In another example, selecting a communication summary in the conversation thread 166 can cause a profile for a sender or one or more recipients of the related communication to be displayed. In another example, selecting a communication summary in the conversation thread 166 can cause one or more attachments or a list of attachments to the related communication to be displayed. In some implementations, selecting a communication summary in the conversation thread 166 can cause a communication addressed to the sender or one or more recipients of the related communication to be automatically generated. In some implementations, selecting a communication summary in the conversation thread 166 can cause a more detailed summary for the related communication to be displayed. In some implementations, selecting a communication summary in the conversation thread 166 can cause a communication profile containing information about the communication to be displayed.

The viewing panel 164 can include a detail adjustment control 182. the detail adjustment control 182 can be used to modify the amount of detail that is displayed in each communication summary in the conversation list 166. In one implementation, adjusting the detail adjustment control 182 can increase or decrease the number of words or lines of a body of a communication that are displayed in each communication summary. In some implementations, adjusting the detail adjustment control 182 can increase or decrease the amount of information that is displayed for each communication summary. For example, the detail adjustment control can be changed to display an e-mail address and phone number for each sender or recipient of each communication 178 in the corresponding communication summary. In another example, the detail adjustment control 182 can be used to control what information is used to identify senders or recipients of communications 178 in each communication summary. Information used to identify senders or recipients can include names, nick names, screen names, e-mail addresses, telephone numbers, social network profile names, or company names.

In some implementations in which some or all of the communications that make up a conversation thread 166 are telephone calls or voice over IP communications, audio recordings of some or all of the telephone calls or voice over IP communications can be displayed in the conversation thread 166. Clicking on or selecting a telephone call or voice over IP communication in the conversation thread 166 can cause an audio recording of the communication to play. In some implementations, automatically or manually created transcripts of telephone calls or voice over IP communications that make up part or all of a conversation thread 166 can be displayed. In some implementations, a summary of a transcript of the audio communication can be displayed as part of a communication summary in the conversation thread 166. Clicking on or selecting a communication summary of a telephone call or voice over IP communication for which a transcript exists can cause the full transcript of the audio communication to be displayed, or an audio file of the audio communication to play.

The viewing panel 164 can include a conversation participants list 184. The conversation participants list 184 can be a list of senders and recipients of the communications 178 that make up the conversation thread 166. Information about each participant in the conversation thread 166 can be displayed, including name, contact information, number of communications initiated in the displayed conversation thread 166, and other relevant information. The conversation participants list 184 can also indicate the total number of participants involved in the conversation thread 166.

In some implementations, clicking on or selecting a person listed in the conversation participants list 184 can cause a profile for the selected person to be displayed. In some implementations, selecting a person from the conversation participants list 184 can automatically generate a communication addressed to the selected person. In some implementations, selecting a person from the conversation participants list 184 can cause all communications or summaries of communications from the current conversation thread 166 that were initiated by the selected person to be displayed.

The viewing panel 164 can include a files exchanged list 186. The files exchanged list 186 can display a list of files that have been exchanged in the current conversation thread 166. For example, the files exchanged list 186 can list all of the files that have been attached to communications 178 in the conversation thread 166. Clicking on or selecting a file from the files exchanged list 186 can cause the selected file to open. In some implementations, selecting a file from the files exchanged list 186 can cause one or more communications to which the file was attached to be displayed. In some implementations, selecting a file from the files exchanged list 186 can cause one or more communication summaries for communications to which the file was attached to be displayed.

In some implementations, the viewing panel 164 can include web information derived from links in one or more of the communications 178 in the conversation thread 166. For example, one of the communications 178 can contain a link to a website for a restaurant. Information about the restaurant, such as hours of operation, address, daily specials, or type of food can be displayed in the viewing panel 164. In another example, a communication 178 in the conversation thread 166 can contain a link to a document that contains information about an upcoming meeting. Information about the meeting, such as meeting time, location, or agenda items can be displayed in the viewing panel 164. In another example, one of the communications 178 can contain a link to a website for a concert. Information about the concert, such as date, time, location, and artists performing, can be displayed in the viewing panel 164.

In some implementations, the viewing panel 164 can include information derived from a file attached to one or more of the communications 178 in the conversation thread 166. For example, if a file containing information about a birthday party is attached to one of the communications, information about the birthday party, such as name of the person who's birthday it is, date, time and location can be displayed in the viewing panel 164.

In some implementations, addresses or maps of locations listed in one or more of the communications 178 or in one or more files attached to one or more of the communications 178 can be displayed. For example, if an address is listed in one of the communications 178, the address can be displayed in the viewing panel 164. In another example, if an address is listed in one of the communications 178, a map of the address can be displayed in the viewing panel 164. In another example, if a city is listed in an attachment to one of the communications 178, a map of the city can be displayed in the viewing panel 164.

Figure 2:
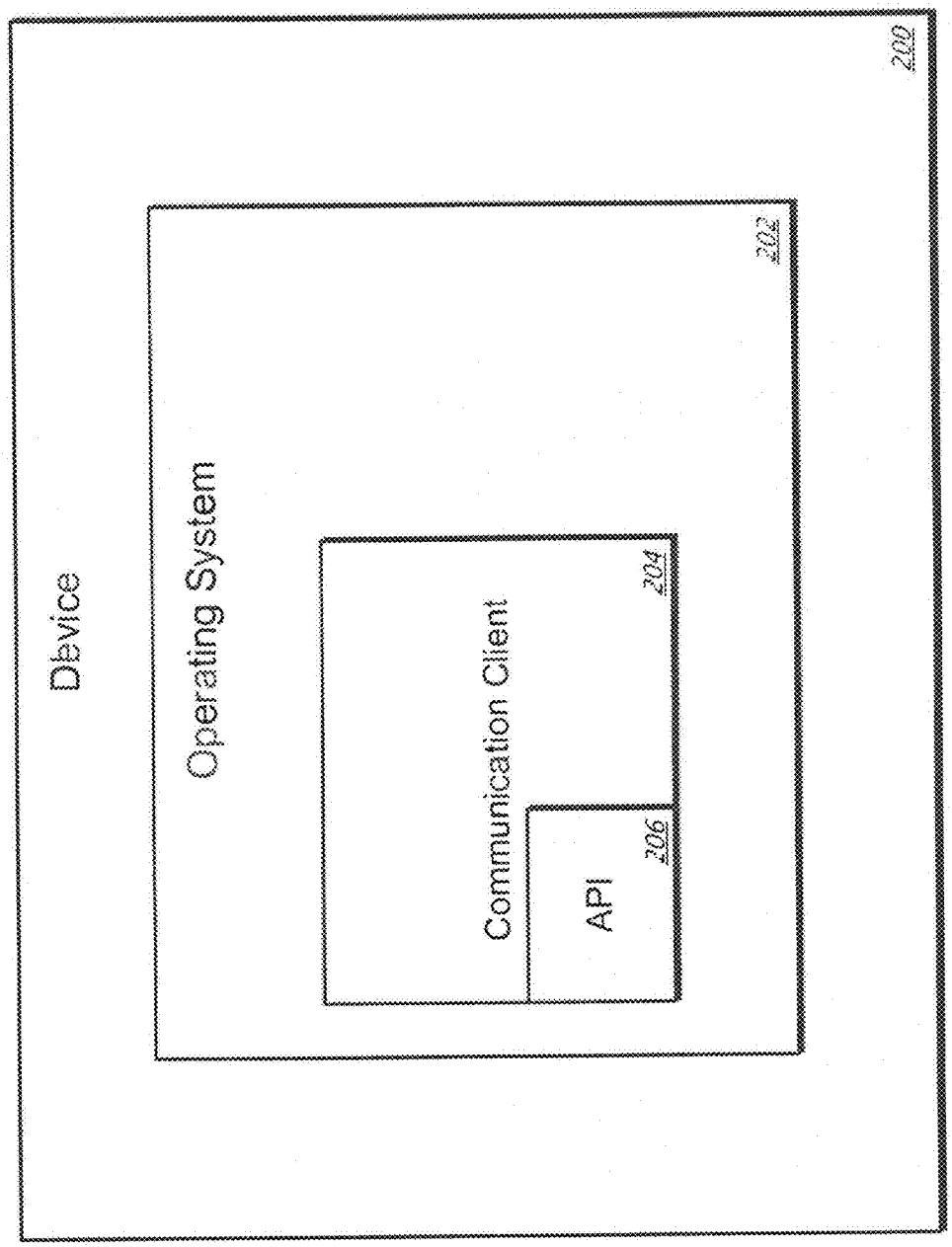
FIG. 2 is a block diagram of a device that includes a communication client with an application programming interface.

FIG. 2 shows a device 200. The device 200 can be a computer, cellular phone, mobile device, personal digital assistant, or web enabled television. The device 200 can include an operating system 202. The operating system 202 can manage and coordinate activities and the allocation of resources on the device 200. The operating system 202 can manage application programs that are run on the device 200 and handle the details of the operation of hardware on the device 200.

The operating system 202 can run a plurality of applications at once including a communication client 204. The communication client 204 can be an e-mail client, instant message client, social network client, text message client, or voice communication client (i.e. Voice Over Internet Protocol client). For example, the communication client 204 can be an e-mail client such as Microsoft Outlook, or Eudora. In another example, the communication client 204 can be an instant message client such as AOL instant messenger. In some implementations, the communication client 204 can be a web based communication client, such as a web based e-mail client, web based instant message client, web based social network client, or web based voice communication client. For example, the communication client 204 can be a web based e-mail client such as Yahoo! mail, Gmail, or Hotmail.

The communication client 204 can include an application programming interface (API) 206. The API 206 can be used to develop applications (e.g., facilitate information exchange with) for the communication client 204. The API 206 can be used to develop applications that can be used with a plurality of communication clients including the communication client 204. This allows a developer using the API 206 to develop an application that is specific to communication clients in general, instead of specific to just one communication client. For example, a developer can use the API 206 to develop a single application that can exchange data with various e-mail clients such as Microsoft Outlook, Thunderbird, Yahoo! Mail, Gmail, Hotmail, and Eudora. In another example, a developer can use the API 206 to develop a single application that can exchange data with various communication clients such as AOL Instant Messenger, Microsoft Outlook, Thunderbird, Gmail, Facebook, and Myspace.

The API 206 can be used to develop applications that relate to features of the communication client 204 or content or data associated with the communication client 204. For example, the API 206 can be used to develop an application for generating and displaying profiles, such as the profile 130 from FIG. 1B, that can run on numerous communication clients. In another example, the API 206 can be used to develop an application for generating and displaying conversation thread profiles, such as the conversation thread profile described in FIG. 1C, that can run on numerous communication clients. In another example, the API 206 can be used to develop an application that evaluates communications in a conversation thread and determine the percentage of "Dilbert Speak" contained in the conversation thread that can be run on numerous communication clients.

The API 206 can ensure that all information that an application requires from the communication client 204 is passed to the application. For example, the API 206 can be used to develop an application that can parse a selected communication. The application can inform the API 206 that it requires notice when a new communication is selected or viewed and further requires access to the text and meta data associated with the communication. The API 206 can then send an alert to the application whenever a communication is selected or viewed and allow the application access to the text and metadata of the communication. In some implementations, the API 206 can pass the text and metadata of a selected communication to the application.

In another example, the API 206 can be used to develop an application that can display information about projects and sales pitches involving a client when a communication from the client is selected or viewed. The application can retrieve data from a central database of client information based on a selected client's name, e-mail address, company name or other identifying information. The application can inform the API 206 that it requires notice when a communication is selected or viewed and further requires access to a name, e-mail address, company name and other identifying information of a sender of the selected communication. The API 206 can be used to run the application in association with any communication client and allow the application to know when a communication in any communication client has been selected and pass the required information to the application from any communication client.

The API 206 can abstract out common elements of all communication clients, or all of a particular type of communication client. For example, the API 206 can abstract out common elements of all e-mail applications such as subject lines, To fields, From fields, CC fields, BCC fields, date and time stamps, attachments, e-mail body text, e-mail meta data, and contacts lists. This allows the API 206 to respond to requests for information from applications for every e-mail client. For example, an application can request information about the To, From, CC and BCC fields of an e-mail within an e-mail client. The API 206 can identify these elements for every e-mail client so that the application can receive the required data on every e-mail client.

The API 206 can allow developers to write applications that are relevant to entities associated with the communication client 204 such as people, communications, conversation threads, attachments, files, and meeting requests. For example, the API 206 can allow an application to deal with e-mails as entities, such as the example application described above that parses an email. In another example, the API can allow an application to be person based, such as an application that generates and displays profiles, or the above described example application in which information about a person is pulled from a customer database.

The API 206 can execute an application, or make a call to an application whenever an entity associated with the application is displayed, selected, or interacted with in the communication client 204. For example, a person based application can be called whenever information about a person is displayed in the communication client 204 or in another application running on the API 206. In another example, a person based application can be called whenever an e-mail is viewed or selected since viewing or selecting of an e-mail can be an implicit request to run a person based application in relation to a sender or recipient of the selected e-mail. In another example, a conversation thread based application can be called when a conversation thread is viewed or selected, or when a communication that is part of a conversation thread is viewed or selected.

For example, continuing with the above described example application in which information about a person is pulled from a customer database, the API 206 can make a call to the application when an e-mail from a person named Jeff is selected. The API 206 can pass all of the necessary identifying information for Jeff to the application. The application can then retrieve information about Jeff from a customer database and display the information. A user can then select an e-mail from a person named Matt. The API 206 can inform the application that an e-mail from Matt has been selected and pass the necessary identifying information for Matt to the application. The application can then retrieve information about Matt from the customer database and display the information.

The API 206 can have display functionality and logic functionality implemented as separate presentation and logic layers. The display functionality can allow an application to generate and present a visual display to a user regardless of the communication client that the application is running on. The logic functionality can allow an application to render data. For example, following with the customer database example above, when the e-mail from Jeff is selected, the logic functionality of the API 206 allows the application to retrieve data about Jeff from the customer database and organize the data. The application can also select which data related to Jeff should be displayed. The display functionality of the API 206 allows the application to generate a graphic display of the information and present it to a user.

In some implementations, the API 206 can be implemented using various programming languages, mark up languages, or scripting languages. In some implementations, the display functionality and the logic functionality can be implemented using different programming languages, mark up languages, or scripting languages. For example, the display functionality can be implemented using HTML and the logic functionality can be implemented using javascript. Javascript is designed to manipulate HTML. Therefore, using javascript for the logic functionality allows the logic functionality to manipulate the code of the display functionality.

Javascript and HTML are commonly used as web based programming languages, but can be used in a desktop environment in some implementations. For example, in an implementation in which the device 200 is a desktop computer, the communication client 204 can be an e-mail client, such as Microsoft Outlook, that runs locally on the device 200. The API 206 can use javascript to implement the logic functionality and HTML to implement the display functionality locally on the device 200.

In some implementations, the display functionality of the API 206 can allow an application to request predefined styled display elements. For example, an application for generating and displaying a profile, such as the profile 130 from FIG. 1B, can request that a title bar, such as the title bar 136, be displayed with the text "Jen Ertel". The API 206 can select a predefined style for the title bar with a predefined color and text font. This way all applications that are run using the API 206 can have a similar look. This allows a user to make a visual connection between various applications associated with the API 206. In another example, an application can request a search bar, such as the search bar 134 from FIG. 1B. The API 206 can select a predefined search bar with a predefined style having predefined icons, but allow the application to select a color for the search bar. This allows applications to be visually linked by a user by having similar looking search bars, but still allows each application to have a different color scheme so that the applications can be differentiated from each other. In another example, an application can request an icon for identifying an attachment to a communication. The API 206 can provide a paper clip icon that is the same for each application. This way, the icon used to indicate an attachment will be the same for each application run by the API 206.

In some implementations, the API 206 can allow an application to request a completely predefined styled environment rather than just requesting individual predefined styled display elements. The application can provide content to the API 206 with the different types of content identified and allow the API 206 to render a display using a predefined styled environment. For example, an application can provide content to the API 206 and indicate which portions of the content are titles, subtitles, main body content, header information, or secondary content and which portions of content relate to other portions of content. The API 206 can insert each type of content into a predefined area within a predefined styled environment. The API 206 can also display portions of content according to relationships defined by the application. For example, the API 206 can display sections of main body content near subtitles to which the sections are related.

In some implementations, the API 206 can allow an application to define it's own styled environment. In some implementations, the API 206 can allow an application to select a predefined styled environment from a plurality of predefined styled environments. The API 206 can ensure that the display for an application is consistent regardless of the communication client that the application is running on.

In some implementations, the API 206 can run a plurality of applications simultaneously and display graphic displays for each application simultaneously. The API 206 can allow a user to configure a layout when multiple applications are running and providing graphic displays. The user can determine the order and orientations of the displays of the applications. The user can also define a size for each application display. For example, the user can determine that an application that displays a person's current geographic location should be displayed above an application that displays pictures from a social network website that have been tagged with the person's name. In another example, the user can determine that a display for an application that displays a conversation thread profile should be larger than a display for an application that translates a selected communication into French.

In some implementations, different applications can be displayed depending on an entity that is selected or viewed. For example a set of person based applications can be displayed when a person's name is selected and a set of conversation thread based applications can be displayed when a conversation thread is selected. In some implementations, more than one set of entity based applications can be displayed when an entity is selected or viewed. For example, when an instant message is selected, a set of communication based applications that display information related to the instant message can be displayed and a set of applications that display information related to the sender of the instant message can also be displayed.

In some implementations, the API 206 can allow a user to define different layouts dependent on what type of entity is selected or viewed. For example, the user can define a first layout for person based applications when a person's name is selected, the user can define a second layout for conversation thread based applications when a conversation thread is selected, and the user can define a third layout for person based and communication based applications when a communication is selected.

The API 206 can include layout functionality that allows a user to define one or more layouts for applications executing in association with the API 206. The layout functionality can provide a graphic display to the user of how applications can be displayed. The user can use the graphic display to move and resize applications and define their positions and sizes in relation to each other, in relation to the communication client 204, or in relation to a display screen of the device 200. The layout functionality can allow the user to define one or more layouts that are the same regardless of the communication client being used by the user. In some implementations, the layout functionality can allow the user to define different layouts for different communication clients or different types of communication clients. For example, the user can define a first layout for all local e-mail clients, a second layout for all web based e-mail clients, and a third layout for all instant message clients. In another example, the user can define a first layout for Microsoft Outlook and a second layout for Thunderbird.

In some implementations, the API 206 can allow a user to define different security and access settings for each application. This allows the user to prevent applications from performing actions that the user does not want the applications to perform. For example, the user can restrict an application's access to a particular block of memory to prevent the application from being able to delete or edit files stored in the block of memory. In another example, the user can restrict an application from accessing a set of sensitive or proprietary communications. In another example the user can allow a first application access to a network or the Internet and allow a second application to only access e-mail data. In another example, the user can allow an application to access e-mail data that is non-work related and restrict the applications access to internal company e-mails. In another example, the user can allow an application to only access communications exchanged with a particular person. In another example, the user can allow an application to only access To field and subject line data from e-mails.

In another example, following the example above of the application that can pull photos from a social network website, the user can allow the application to access sender e-mail address and name information from a selected e-mail and can allow the application to access the Internet to retrieve the photos. The application does not need access to e-mail data other than the e-mail address and name information from a currently selected e-mail since this is the only information the application needs to identify photos on the social network website.

In some implementations, the API 206 can allow each application to define it's own access requirements. This can be done when the application is first installed, or every time a call is made to the application. In some implementations, a user can be prompted when an application is installed to inform the user of the access requirements being requested by the application. The user can then decide to approve or reject the requested access requirements of the application. For example, when an application is installed, the application can inform the API 206 that it requires access to the Internet and an e-mail address of a person for whom it is supposed to gather information. The API 206 can then display a prompt to inform the user that the application requires Internet access and access to e-mail addresses for persons for whom it is supposed to gather information. The user can then choose to approve or deny the access requirements of the application.

In some implementations, applications associated with the API 206 can require Internet access either for access to code run by the application or data used by the application. Internet access may not always be available. For example, a user of the device 200 may be on a plane, or in an area with no internet service. In another example, the device 200 can have Internet access, but one or more websites to which the application requires access may be down or otherwise unavailable. In some implementations, when an application is unable to access web or network data that it requires to perform one or more functions, the API 206 can temporarily disable the application until access to the required data is restored. The API 206 can further remove a display of the application from a screen of the device 200. In some implementations, the API 206 can display a prompt to inform a user that the application can not currently access required data and that the application is being temporarily disabled. In some implementations, the API 206 can allow the user to determine if the application should be disabled when access to the required data is unavailable.

In some implementations, the API 206 can temporarily disable an application when data required by the application is available, but is loading at a slow rate. For example, the API 206 can temporarily disable an application if it takes longer than 5 seconds for the application to load a segment of code from a website. In another example, the API 206 can temporarily disable an application if it takes longer than 20 seconds for the application to load pictures from a social network website. In some implementations, the API 206 can temporarily disable an application if the application is rendering data too slowly. For example, the API 206 can temporarily disable an application if it takes longer than 3 seconds to render information related to an e-mail when the e-mail is selected.

In some implementations, the API 206 can disable an application that is performing non-approved activities or violating a programming contract. For example, the API 206 can disable an application with a memory leak. In another example, the API 206 can disable an application that is writing to sections of a hard drive to which the application should not have write access. In some implementations, the API 206 can alert the user when an application performs a non-approved activity and is disabled. In some implementations, the API 206 can alert a developer of an application when the application performs a non-approved activity so that the developer can address the problems with the application.

In some implementations, the API 206 can periodically check for updates to applications that are associated with the API 206. For example, the code for an application can be cached on a local hard drive of the device 200. The API 206 can then periodically access a web server that hosts code for the application to check for updates to the application. The updated application code can then be downloaded and installed. In another example, the code for an application can be cached in a remote database that the API 206 can access. The API 206 can then periodically access a web server that hosts code for the application to check for updates to the application and update the code in the remote database.

In some implementations, the API 206 can include payment functionality that allows developers of applications to charge a user of the device 200 for using the applications. The API 206 can process payment information for the user and access a service that can collectively process payment information for all of the applications which require payment from the user. The service can also handle fraud protection for all of the applications. The service can send checks or electronic payments to developers for each of the applications that require payment from the user.

For example, the user can purchase an application that generates and displays profiles, such as the profile 130 from FIG. 1B. The user can use payment functionality of the API 206 to input payment information, such as a credit card number. The API 206 can then forward this information to a service that charges the appropriate amount to the user's credit card, sends payment to the developer of the application, and delivers the application to the user.

Figure 3:
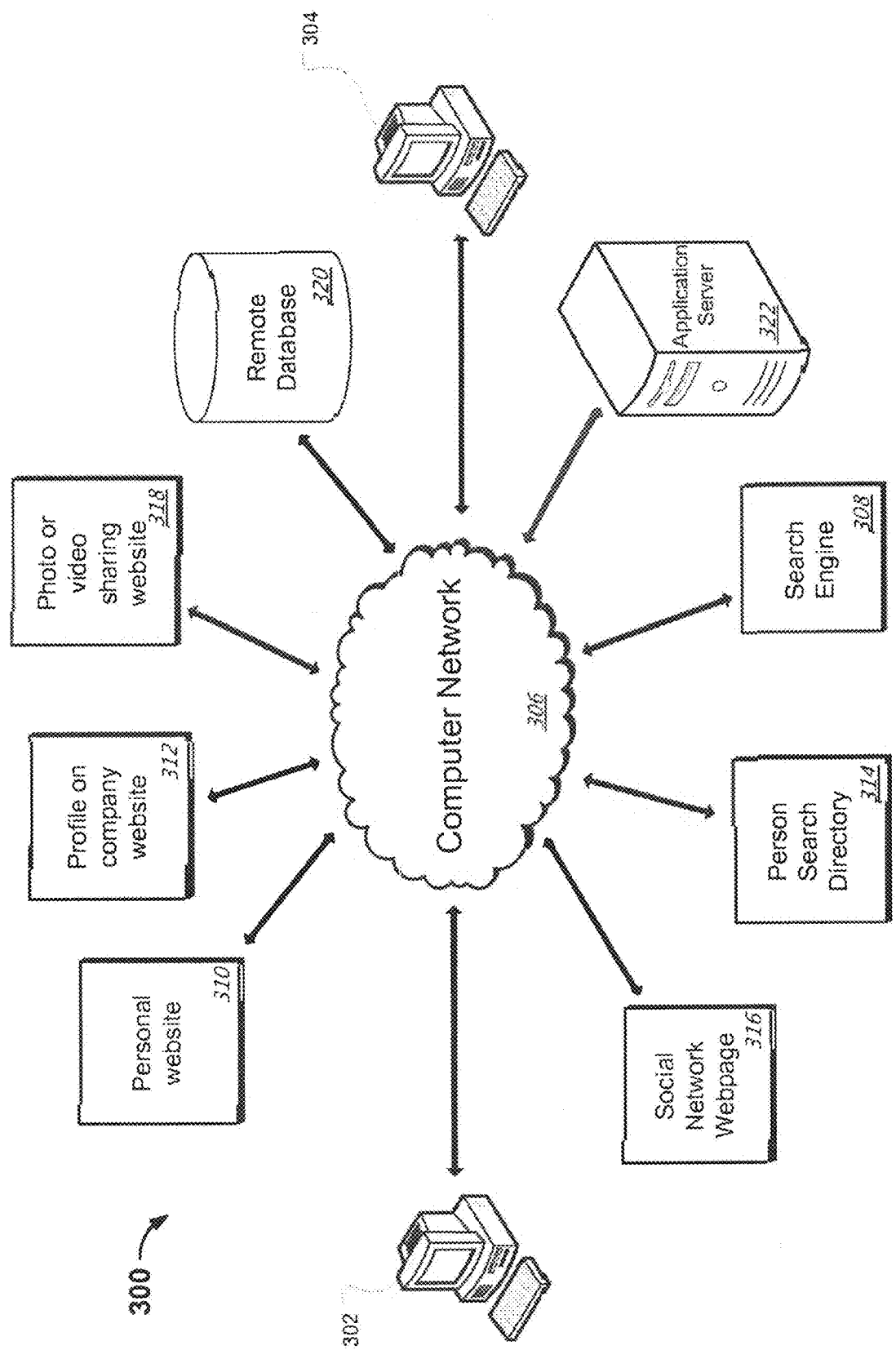
FIG. 3 is a block diagram of an example communication delivery system.

FIG. 3 shows an example communication delivery system 300. In the system 300, a first device (e.g., computer 302) belonging to a first user can transmit a communication to a second device (e.g., computer 304) belonging to a second user over a computer network 306. The computer network 306 can be the Internet, an intranet, a LAN system or a company's internal computer network. In some implementations, the computer 302 and the computer 304 can be desktop computers, laptop computers, cell phones, web enabled televisions, or personal digital assistants. The communication transmitted from the computer 302 to the computer 304 can be an e-mail, phone call, instant message, text message, social network message or comment, message board post, or voice over IP communication.

The computer 304 can extract data from the communication about the first user. This data can be used to make a profile similar to the profile 130 shown in FIG. 1B. Data extracted from other communications with the first user can also be used to create a profile for the first user. Data that is extracted from communications with the first user can be used to query websites, search engines, person search directories and other sources of information for additional information about the first user that can be used to create a profile. Information from communications that can be used as search criteria include names, screen names, social network profile names, social network profile URLs, physical addresses, website URLs, e-mail addresses, or telephone numbers. Information that is collected as a result of these queries can be used in future searches to identify additional information that can be used to create a profile.

For example, the computer 304 can receive an e-mail sent by the first user from the computer 302. The computer 304 can perform a search using a search engine 308 with the first user's e-mail address as the search criteria. The search engine 308 can return a search result that includes the first user's phone number. This phone number can be displayed as part of a profile for the first user. The search engine 308 can also return the URL for or link to a personal website 310 belonging to the first user. The personal website 310 may contain additional information about the first user that can be used to create a profile, such as additional contact information or biographical information.

In another example, the e-mail address belonging to the first user may include an extension for a company. The computer 304 can perform a search using the search engine 308 with the e-mail extension as the search criteria. A result returned by the search can be a company website. The company website can be searched to reveal a profile page 312 for the first user on the company website. The profile page 312 may contain additional information about the first user that can be used to create a profile, such as additional contact information or biographical information.

In another example, the computer 304 can perform a search using a person search directory 314 with the first user's name or other contact information as the search criteria. The person search directory 314 can return search results with additional contact information and other information that can be used to create a profile for the first user.

In another example, the computer 304 can receive an e-mail sent by the first user from the computer 302. The e-mail can contain a social network profile name for the first user. The computer 304 can extract this social network profile name from the e-mail and use it to access a social network webpage 316. The social network webpage 316 can contain additional contact information and other information that can be extracted and used to create a profile for the first user. The social network webpage 316 can also contain additional contacts that can be associated with the first user in a profile. For example, persons on the friends list of the social network webpage 316, or persons who have posted comments or messages on the social network webpage 316 can be listed as contacts in a contact network for the first user.

In another example, a search performed using the search engine 308 can return a URL or link for a photo or video sharing website 318 on which the first user has a profile. Additional contact information or biographical information that can be extracted and used to create a profile for the first user. For example, a profile belonging to the first user on a video sharing website may include an instant message screen name for the first user. This screen name can be extracted and displayed as part of a profile for the first user.

In some implementations, the communication data, contact information, bibliographic information and other data collected by the computer 304 can be stored locally on a hard drive or other media storage device of the computer 304. In some implementations, the data collected by the computer 304 is stored in a location external to an e-mail client, instant message client, or other communication client used in making the communications. For example, a profile for the first user can include information about e-mails exchanged between the first user and the second user, the profile for the first user is stored in a memory location on the computer 304 that is separate from a memory location used by an e-mail client used to send and receive the e-mails exchanged between the first user and the second user. In another example, data related to the contents of communications in a conversation thread can be stored in a memory location on the computer 304 that is separate from a memory location used by an e-mail client that was used to send and receive the communications in the conversation thread.

In some implementations, the communication data, contact information, bibliographic information and other data collected by the computer 304 can be stored in a remote database 320 that is external to the computer 304. In some implementations, the computer 304 can connect to the remote database 320 via the computer network 306 as shown in FIG. 3. In some implementations, the computer 304 can connect to the remote database 320 directly or via a separate computer network. The data stored in the remote database 320 can be separate from data stored by an e-mail client, instant message client, or other communication client. For example, an e-mail client running on the computer 304 can store data locally on the computer 304 while data collected as part of a profile, including communication data collected from the e-mail client, is stored in the remote database 320.

In some implementations, the computer 304 can include an application programming interface (API) such as the API 206 from FIG. 2. The API can be associated with applications associated with one or more communication clients. The API can periodically check for code updates to the applications that it runs. The API can access an application server 322 via the computer network 306. The application server 322 can be associated with one or more programs associated with the API. The API can check the application server 322 for updates to the one or more programs. If updates exist, the API can download the updates from the application server 322 and install the updates on the computer 304.

The computer 304 can monitor the behavior of the second user to determine if the second user has made an implicit request to view a profile. For example, the second user can view the social network page 316 for the first user. The computer 304 can detect that the second user is viewing the social network page 316 associated with the first user and present a profile for the first user. In another example, the second user can view a social network profile for a third person which can cause the computer 304 to present a profile for the third person.

In another example, the second user can view the personal website 310 of the first user. The computer 304 can detect that the second user is viewing the personal website 310 associated with the first user and present a profile for the first user. In another example, the second user can view the profile page 312 for the first user on the first user's company website. The computer 304 can detect that the second user is viewing the profile page 312 associated with the first user and present a profile for the first user.

Figure 4:
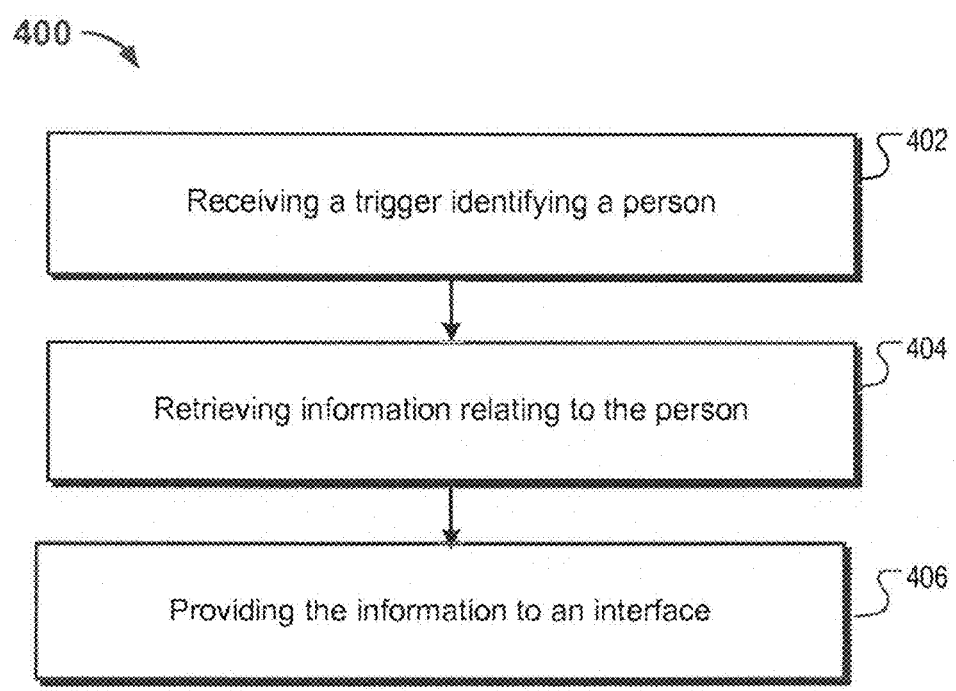
FIG. 4 is a flow diagram of an example process 400 for retrieving and providing information relating to a person.

FIG. 4 is a flow diagram of an example process 400 for retrieving and providing information relating to a person. The process 400 can, for example, be implemented in a system such as the system 100 of FIG. 1A. In another example, the process 400 can be implemented in a system such as the communication delivery system 300 of FIG. 3.

Stage 402 receives a trigger identifying a person associated with a communication. The communication can be transmitted by a communication application. For example, an application associated with an application programming interface (API), such as the API 206 from FIG. 2, can receive a trigger from the API that a communication has been selected. The trigger can identify the sender or one or more recipients of the communication. In another example, an application for generating and displaying profiles, such as the profile 130 from FIG. 1B, can receive a trigger indicating that an e-mail has been selected and information about the sender of the e-mail should be gathered and displayed.

Stage 404 retrieves information relating to the person. For example, an application for generating and displaying profiles, such as the profile 130 from FIG. 1B, can retrieve contact information, contact network information, conversation thread information, and attachment information related to the person in order to generate a profile for the person. In another example, an application can retrieve information about the person from a customer database. In another example, an application can retrieve photos of the person from a social network website.

Stage 406 provides the information to an interface associated with the communication application. For example, an application can provide retrieved information relating to the person to an application programming interface (API), such as the API 206 from FIG. 2. In another example, an application for generating and displaying profiles, such as the profile 130 from FIG. 1B, can provide a profile for the person to an API. In another example, an application can provide photos of the person that have been retrieved from a social network website to an API.

The apparatus, methods, flow diagrams, and structure block diagrams described in this patent document may be implemented in computer processing systems including program code comprising program instructions that are executable by the computer processing system. Some implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

The invention claimed is:

1. A method comprising:
receiving, at a computing device over a network, input identifying a set of users from a device of a first user;
retrieving, by the computing device, communication information between the first user and each user in the set of users, said communication information comprising data associated with communications between the first user and each user over the network, said data indicating characteristics relating to content of each communication and delivery of each communication;
searching, via the computing device, the network to obtain information about each user in the set of users, the information obtained by searching the network being independent from said retrieved communication information;
determining, via the computing device, based on said retrieved communication information and the information obtained by searching the network, a profile of each user in the set of users;
determining, via the computing device, a profile for said first user based on said retrieved communication information and the information obtained by searching the network, said first user profile comprising interactive information associated with each user in said set of users, said determination comprising ranking the communication information of each user based on said determined profile of each user, and configuring said first user profile to display said ranked communication information;
receiving, via the computing device, a request to display said first user profile; and
causing, via the computing device, said first user profile to be displayed in response to said request, wherein said first user profile includes an information item based on a profile of a respective user in the set of users, the information item being selectable to display a source of the information item.

2. The method of claim 1, further comprising:
identifying a type of platform used for each communication between the first user and each user; and
further ranking the communication information within said profile of the first user based on said type of platform.

3. The method of claim 1, wherein said data associated with communications the first user has had with each user comprises data selected from a group consisting of: times of communications, dates of communications, types of communications, volume of communications, length of communications, and speed of responses.

4. The method of claim 1, wherein said searching the network comprises searching at least one information source selected from a group consisting of: web search engines, people search engines, social networks, personal web pages, telephone directories, scanned business card data and company website profiles.

5. The method of claim 1, wherein said input is associated with a selection of said set of users from a web page.

6. The method of claim 1, wherein said input is associated with a selection of said set of users from an application program interface.

7. The method of claim 1, wherein said input is associated with a portion of said set of users, and remaining portion of said set of users are identified based on the identified portion.

8. The method of claim 1, wherein said first user profile comprises a search bar that enables a search for information related to the first user and each user in said set of users.

9. The method of claim 1, wherein said communication information for each respective user is displayed within said profile.

10. The method of claim 1, wherein the information item is selectable to display at least a portion of the source's content including the information item.

11. The method of claim 10, wherein the information item is demarcated in the display of the source's content.

12. A non-transitory computer-readable storage medium tangibly encoded with computer-executable instructions, such that when a computing device executes the instructions, a method is performed comprising:
- receiving, at the computing device over a network, input identifying a set of users from a device of a first user;
- retrieving, by the computing device, communication information between the first user and each user in the set of users, said communication information comprising data associated with communications between the first user and each user over the network, said data indicating characteristics relating to content of each communication and delivery of each communication;
- searching, via the computing device, the network to obtain information about each user in the set of users, the information obtained by searching the network being independent from said retrieved communication information;
- determining, via the computing device, based on said retrieved communication information and the information obtained by searching the network, a profile of each user in the set of users;
- determining, via the computing device, a profile for said first user based on said retrieved communication information and the information obtained by searching the network, said first user profile comprising interactive information associated with each user in said set of users, said determination comprising ranking the communication information of each user based on said determined profile of each user, and configuring said first user profile to display said ranked communication information;
- receiving, via the computing device, a request to display said first user profile; and
- causing, via the computing device, said first user profile to be displayed in response to said request, wherein said first user profile includes an information item based on a profile of a respective user in the set of users, the information item being selectable to display a source of the information item.

13. The non-transitory computer-readable storage medium of claim 12, further comprising:
- identifying a type of platform used for each communication between the first user and each user; and
- further ranking the communication information within said profile of the first user based on said type of platform.

14. The non-transitory computer-readable storage medium of claim 12, wherein said data associated with communications the first user has had with each user comprises data selected from a group consisting of: times of communications, dates of communications, types of communications, volume of communications, length of communications, and speed of responses.

15. The non-transitory computer-readable storage medium of claim 12, wherein said searching the network comprises searching at least one information source selected from a group consisting of: web search engines, people search engines, social networks, personal web pages, telephone directories, scanned business card data and company website profiles.

16. The non-transitory computer-readable storage medium of claim 12, wherein said input is associated with a portion of said set of users, and remaining portion of said set of users are identified based on the identified portion.

17. The non-transitory computer-readable storage medium of claim 12, wherein said first user profile comprises a search bar that enables a search for information related to the first user and each user in said set of users.

18. The non-transitory computer-readable storage medium of claim 12, wherein said communication information for each respective user is displayed within said profile.

19. A computing device comprising:
- a processor; and
- a non-transitory computer-readable storage medium for tangibly storing thereon program logic for execution by the processor, the program logic comprising:
  - logic executed by the processor for receiving, at the computing device over a network, input identifying a set of users from a device of a first user;
  - logic executed by the processor for retrieving, by the computing device, communication information between the first user and each user over the network, said communication information comprising data associated with communications between the first user and each user over the network, said data indicating characteristics relating to content of each communication and delivery of each communication;
  - logic executed by the processor for searching, via the computing device, the network to obtain information about each user in the set of users, the information obtained by searching the network being independent from said retrieved communication information;
  - logic executed by the processor for determining, via the computing device, based on said retrieved communication information and the information obtained by searching the network, a profile of each user in the set of users;
  - logic executed by the processor for determining, via the computing device, a profile for said first user based on said retrieved communication information and the information obtained by searching the network, said first user profile comprising interactive information associated with each user in said set of users, said determination comprising ranking the communication information of each user based on said determined profile of each user, and configuring said first user profile to display said ranked communication information;
  - logic executed by the processor for receiving, via the computing device, a request to display said first user profile; and
  - logic executed by the processor for causing, via the computing device, said first user profile to be displayed in response to said request, wherein said first user profile includes an information item based on a profile of a respective user, in the set of users, the information item being selectable to display a source of the information item.

20. The computing device of claim 19, further comprising:
- identifying a type of platform used for each communication between the first user and each user;

further ranking the communication information within said profile of the first user based on said type of platform.

\* \* \* \* \*